US006992784B1

(12) United States Patent
Kohtani et al.

(10) Patent No.: US 6,992,784 B1
(45) Date of Patent: Jan. 31, 2006

(54) IMAGE PROCESSING APPARATUS, A READER CONTROLLER, AND A METHOD FOR CONTROLLING THE READER CONTROLLER

(75) Inventors: Hideto Kohtani, Yokohama (JP); Koji Arai, Kawaguchi (JP); Takashi Nonaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/447,718

(22) Filed: Nov. 23, 1999

Related U.S. Application Data

(62) Division of application No. 08/901,286, filed on Jul. 29, 1997, now Pat. No. 6,023,559.

(30) Foreign Application Priority Data

| Jul. 31, 1996 | (JP) | ................................. 8/216956 |
| Jul. 31, 1996 | (JP) | ................................. 8/216957 |

(51) Int. Cl.
*G06F 15/00* (2006.01)
*G03G 15/20* (2006.01)
(52) U.S. Cl. ................... 358/1.15; 399/70; 715/527
(58) Field of Classification Search ............... 358/1.15, 358/1.14, 1.13, 1.12, 1.9, 504, 5; 355/246, 355/244; 399/70, 81, 44, 518, 504; 715/527, 715/733, 7
See application file for complete search history.

(56) References Cited

U.S. PATENT DOCUMENTS

| 4,727,435 A | | 2/1988 | Otani et al. .................. 358/296 |
| 5,241,347 A | * | 8/1993 | Kodama ....................... 399/49 |
| 5,452,094 A | * | 9/1995 | Ebner et al. ................. 358/296 |
| 5,475,475 A | | 12/1995 | Kohtani et al. ............. 355/244 |
| 5,764,866 A | * | 6/1998 | Maniwa ...................... 358/1.15 |
| 5,828,462 A | | 10/1998 | Hashimoto et al. ......... 358/296 |
| 5,923,439 A | * | 7/1999 | Tomida et al. .............. 358/404 |
| 6,327,043 B1 | * | 12/2001 | Rumph et al. ............. 358/1.15 |
| 6,400,466 B1 | * | 6/2002 | Yamazaki et al. ......... 358/1.16 |
| 6,462,830 B1 | * | 10/2002 | Negishi ..................... 358/1.12 |
| 6,469,795 B2 | * | 10/2002 | Beaudet et al. ............ 358/1.14 |

* cited by examiner

*Primary Examiner*—Kimberly Williams
*Assistant Examiner*—Saeid Ebrahimi-Dehkordy
(74) *Attorney, Agent, or Firm*—Fitzpatrick, Cella, Harper & Scinto

(57) ABSTRACT

An image processing apparatus includes an engine controller for controlling an image forming mechanism for forming an image on a sheet based on image data, a printer controller for forming image data from printing data transferred from an external apparatus, for transmitting the image data to the engine controller, and for transmitting a command for setting an operation of the engine controller to the engine controller, and a reader controller for controlling an original-reading device for outputting image data by reading an image of an original, and for transmitting the image data output from the original-reading device to the engine controller. The reader controller is provided between the printer controller and the engine controller so as to be communicatable with each of the printer controller and the engine controller, and controls the acquisition of a right to use the engine controller with the printer controller.

27 Claims, 22 Drawing Sheets

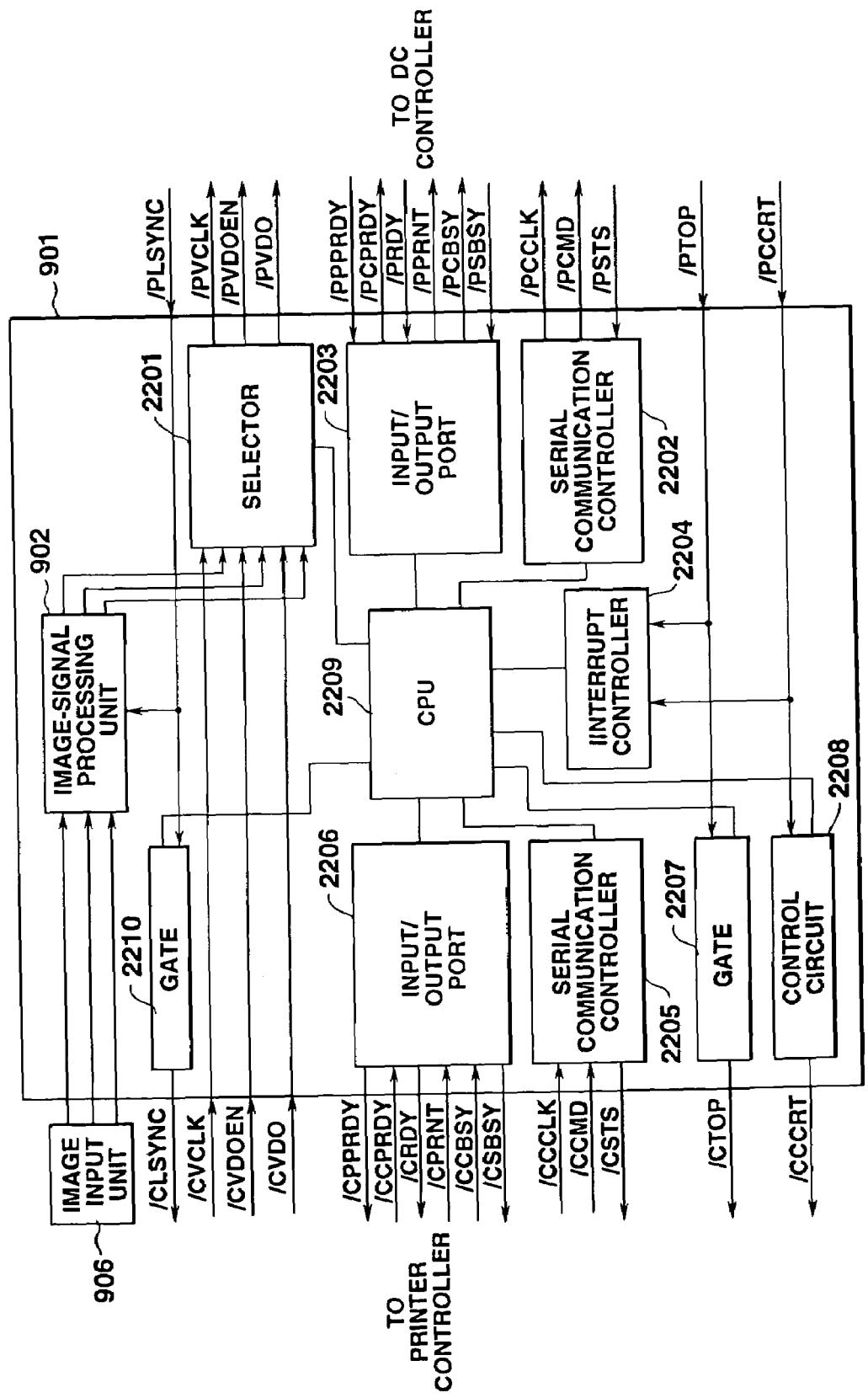

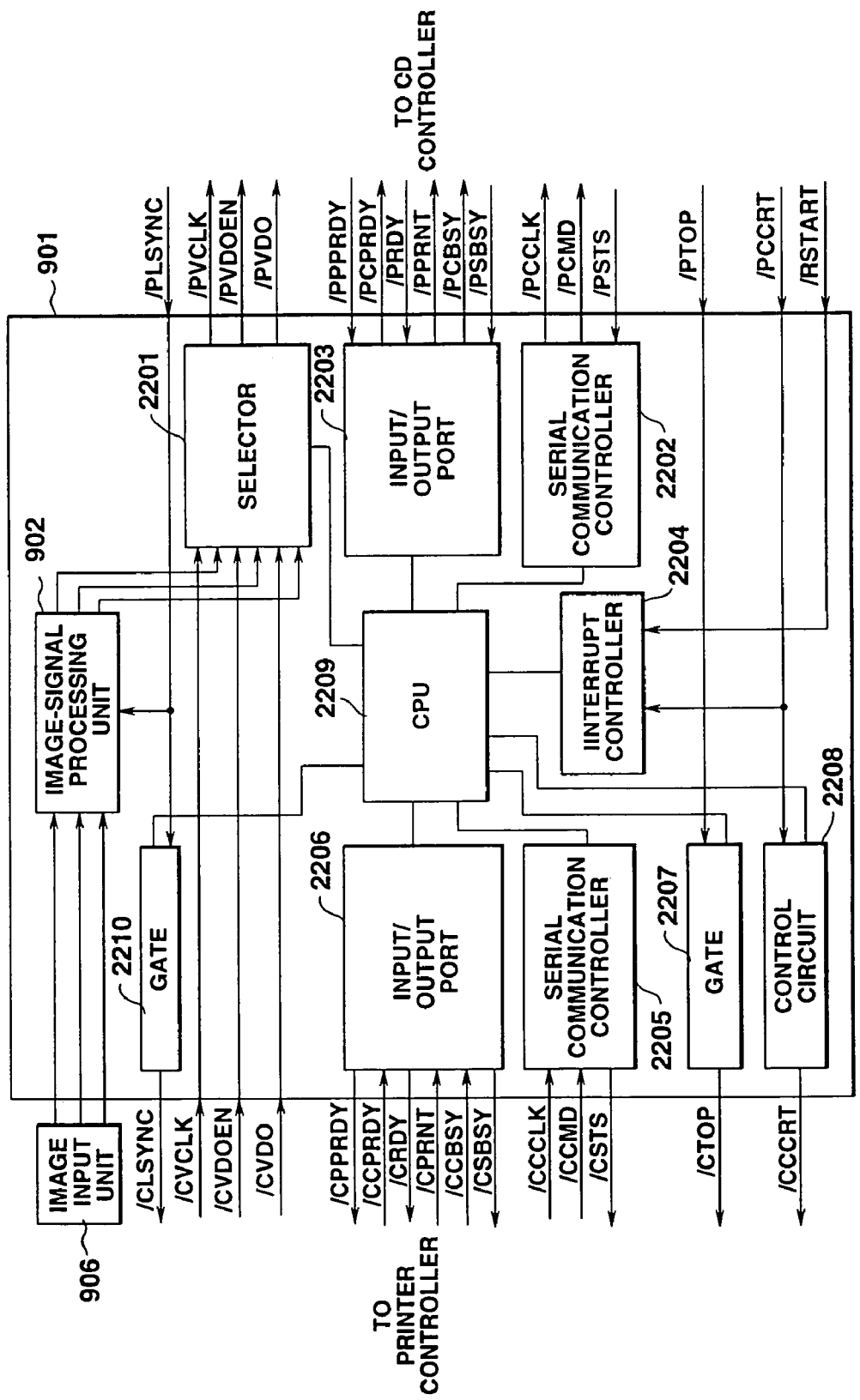

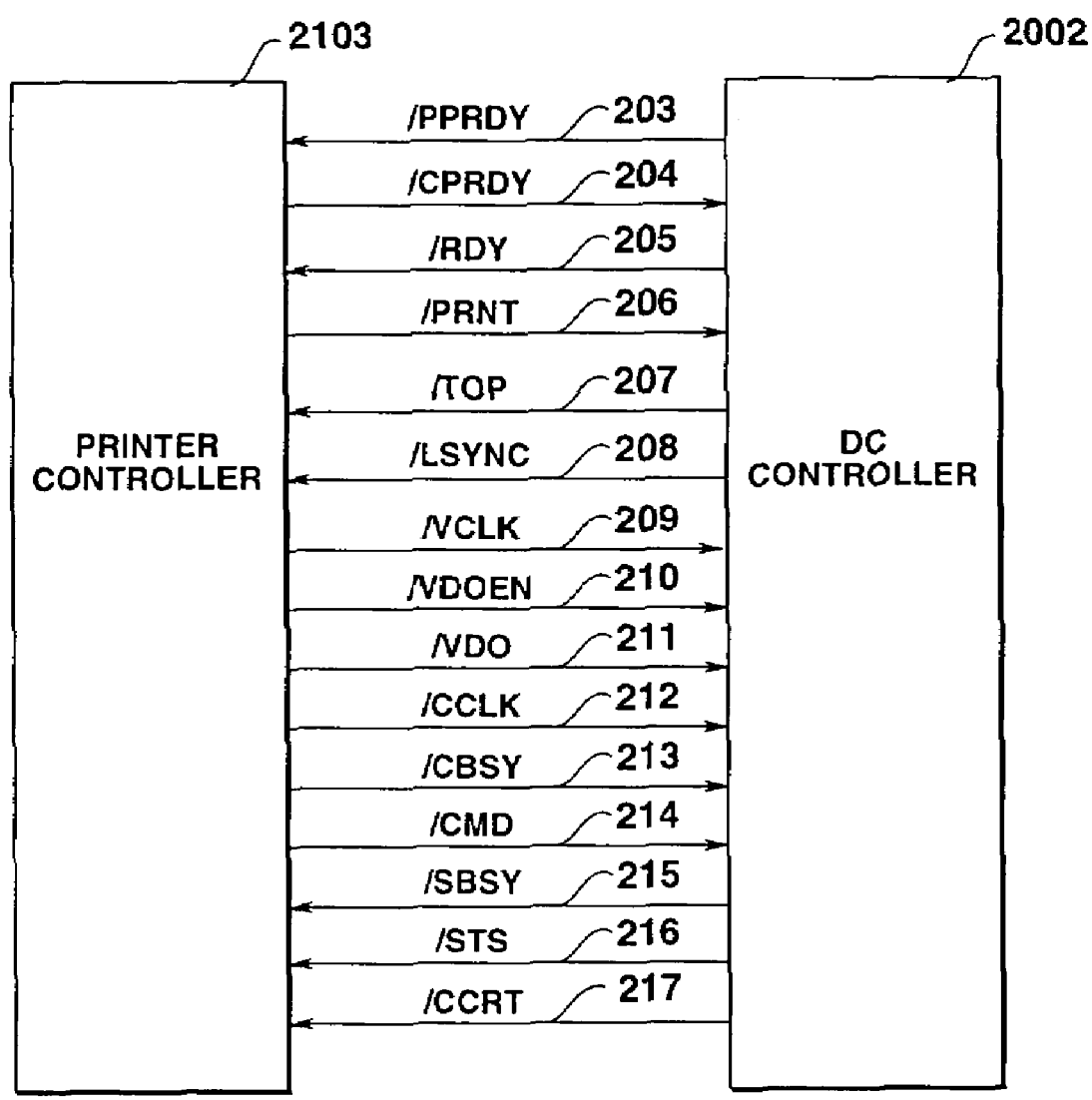

FIG.14

| NAME OF SIGNAL | ABBREVIATION | DIRECTION OF SIGNAL |
|---|---|---|
| PRINTER POWER READY | /PPRDY | CONTROLLER ← PRINTER |
| CONTROLLER POWER READY | /CPRDY | CONTROLLER → PRINTER |
| READY | /RDY | CONTROLLER ← PRINTER |
| PRINTING | /PRNT | CONTROLLER → PRINTER |
| TOP OF PAGE | /TOP | CONTROLLER ← PRINTER |
| LINE SYNCHRONISM | /LSYNC | CONTROLLER ← PRINTER |
| VIDEO CLOCK | /VCLK | CONTROLLER → PRINTER |
| IMAGE ENABLE | /VDOEN | CONTROLLER → PRINTER |
| IMAGE | /VDO | CONTROLLER → PRINTER |
| CONTROLLER CLOCK | /CCLK | CONTROLLER → PRINTER |
| COMMAND BUSY | /CBSY | CONTROLLER → PRINTER |
| COMMAND | /CMD | CONTROLLER → PRINTER |
| STATUS BUSY | /SBSY | CONTROLLER ← PRINTER |
| STATUS | /STS | CONTROLLER ← PRINTER |
| PRINTER POWER READY | /PFED | CONTROLLER ← PRINTER |
| SPEED CHANGE | /SPCHG | CONTROLLER ← PRINTER |
| SHEET DELIVERY | /PDLV | CONTROLLER ← PRINTER |
| TOP OF SHEET | /TOPR | CONTROLLER ← PRINTER |
| NOTIFICATION OF CHANGE IN STATE | /CCRT | CONTROLLER ← PRINTER |

IMAGE PROCESSING APPARATUS, A READER CONTROLLER, AND A METHOD FOR CONTROLLING THE READER CONTROLLER

This application is a divisional of U.S. patent application Ser. No. 08/901,286, filed Jul. 29, 1997 now U.S. Pat. No. 6,023,559.

BACKGROUND OF THE INVENTION

1. Field of the Invention

This invention relates to an image processing apparatus having a printer function and a copying function, a reader controller mounted in such an apparatus, and a method for controlling the reader controller.

2. Description of the Related Art

In general, printing apparatuses include ink-jet printers, thermal transfer printers, electrophotographic printers and the like. The electrophotographic printers include, for example, laser-beam printers.

A description will now be provided of the configuration and the state of use of a laser-beam printer with reference to FIGS. 19 and 20. FIG. 19 is a schematic block diagram illustrating the configuration of a conventional laser-beam printer. FIG. 20 is a diagram illustrating the state of use of the laser-beam printer shown in FIG. 19.

As shown in FIG. 19, the laser-beam printer includes an engine controller (hereinafter termed a "DC controller") 2002 for driving an image forming mechanism 2003 for executing a series of processing of conveying a sheet and forming an image represented by image data on the sheet, and a printer controller 2103 for performing data processing of generating image data by processing printing data transferred from a host computer 2104, setting an operation for the DC controller 2002, transmitting the image data at a predetermined timing corresponding to the DC controller 2002, and transmitting a command relating to the setting of the operation of the DC controller 2002. The image forming mechanism (engine) 2003, the DC controller 2002 and the printer controller 2103 are mounted in a main body 2001 of the printer together with an option controller 2006 (to be described later).

An optional sheet feeding cassette 2004 and a sorter 2005 are also mounted in the main body 2001 of the printer. Driving operations for the optional sheet feeding cassette 2004 and the sorter 2005 are controlled by the option controller 2006. The option controller 2006 controls driving operations for the optional sheet feeding cassette 2004 and the sorter 2005 based on commands from the printer controller 2103.

As shown in FIG. 20, the laser-beam printer can be used as a dedicated printer for the host computer 2104, or as a printer shared in a network. More specifically, when using the laser-beam printer as a dedicated printer for the host computer 2104, the printer controller 2103 is connected so as to be communicatable with the host computer 2104, and performs processing, for example, of analyzing printing data supplied from the host computer 2104, generating image data so as to be subjected to printing processing based on the analysis, and transmitting the generated data to a printer engine 2102, and outputs a control command relating to printout by the printer engine 2102. The image data and the control command are transmitted to the printer engine 2102 via a video I/F (interface) 2101. The printer engine 2102 indicates a unit including the image forming mechanism (engine) 2003, the DC controller 2002, the optional sheet feeding cassette 2004, the sorter 2005 and the optional controller 2006 shown in FIG. 19.

The printer engine 2102 prints the image data transmitted from the printer controller 2103 based on the control command from the printer controller 2103. Each processing to be executed during the printing operation, such as sheet feeding processing, printing processing, sheet discharging processing or the like, is controlled by the DC controller 2002 and the optional controller 2006.

Recently, multifunctional apparatuses have been developed. For example, by being combined with an image reading device and a host computer, the above-described laser-beam printer can realize a copying function. Alternatively, by incorporating an image reading device in the laser-beam printer, a composite apparatus having a printer function and a copying function is provided.

A description will now be provided of apparatuses having such functions with reference to FIGS. 21 and 22. FIG. 21 is a diagram illustrating an approach of realizing a copying function by a laser-beam printer by being combined with an image reading device and a host computer. FIG. 22 is a diagram illustrating the configuration of a composite apparatus having a printer function and a copying function by incorporating an image reading device in a laser-beam printer.

In the approach shown in FIG. 21, if the laser-beam printer is used as a dedicated printer for the host computer 2104 (as shown in FIG. 20), an image reading device 2501 is connected to the host computer 2104, and read data obtained from the image reading device 2501 is output to the printer controller 2103 via the host computer 2104, so that a copying function can be executed using the printer function of the laser-beam printer.

Alternatively, if the laser-beam printer is used as a printer shared in a network 2105 (as shown in FIG. 20), the image reading device 2501 is connected to the network 2105, and read data obtained from the image reading device 2501 is output to the printer controller 2103 via the network 2105, so that a copying function can be executed using the printer function of the laser-beam printer.

The composite apparatus shown in FIG. 22 includes a controller unit (printer controller) 2602 connected so as to be communicatable with the host computer 2104, a reader unit (image reading device) 2502 for reading an image of an original, an I/F 2601 for connecting the controller unit 2602 to the reader unit 2502 so as to be communicatable with each other, and a selector unit 2603 for selecting one of image data from the controller unit 2602 and image data from the reader unit 2502 and outputting the selected data to the printer engine 2102. In the composite apparatus having the above-described configuration, the selector unit 2603 selects one of image data from the controller unit 2602 and image data from the reader unit 2502 while confirming the operational states of the controller unit 2602 and the reader unit 2502 via the I/F 2601, and outputs the selected image data to the printer engine 2102, so that one of the printer function and the copying function can be executed.

However, in the configuration shown in FIG. 21, image data obtained from the image reading unit 2501 is output to the printer controller 2103 via the host computer 2104 or the network 2105 during the execution of a copying mode. Accordingly, a considerable time is required for transferring the image data output from the image reading device 2501 to the printer controller 2103, and therefore a copy output cannot be obtained in a real time.

In the composite apparatus shown in FIG. 22, since it is necessary to newly provide the I/F 2601 for connecting the controller unit 2602 to the reader unit 2502, it is necessary to greatly change the hardware and software in order to provide a composite apparatus having a printer function and a copying function based on a conventional laser-beam printer, thereby providing a surplus time for the development of the apparatus, and a possibility of greatly increasing the production cost.

SUMMARY OF THE INVENTION

The present invention has been made in consideration of the above-described problems.

It is an object of the present invention to provide an image processing apparatus, a reader controller, and a method for controlling the reader printer, in which a copying function having a high processing speed can be realized without greatly changing the hardware and software in the configuration of a printer function caused by the addition of an image reading device in order to add the copying function to the printer function.

It is another object of the present invention to efficiently realize both a printer function and a copying function without causing interference between these functions.

It is still another object of the present invention to provide a copying function by utilizing a printer function which is originally provided.

According to one aspect, the present invention which achieves these objectives relates to an image processing apparatus including an engine controller for controlling an image forming mechanism for forming an image on a sheet based on image data, a printer controller for forming image data from printing data transferred from an external apparatus, for transmitting the image data to the engine controller, and for transmitting a command for setting an operation of the engine controller to the engine controller, and a reader controller for controlling an original-reading device for outputting image data by reading an image of an original, and for transmitting the image data output from the original-reading device to the engine controller. The reader controller is provided between the printer controller and the engine controller so as to be communicatable with each of the controller and the engine controller, and controls the acquisition of a right to use the engine controller with the engine controller.

According to another aspect, the present invention which achieves these objectives relates to a reader controller for controlling an original-reading device for outputting image data by reading an image of an original. The reader controller includes a reception unit for receiving image data and a command for setting an operation from a printer controller for forming image data from printing data transferred from an external apparatus, a transmission unit for transmitting image data and a command for setting an operation to an engine controller for controlling an image forming mechanism for forming an image on a sheet based on image data, a selection unit for selecting one of the image data output from the original-reading device and the image data received from the printer controller as the image data to be transmitted from the transmission unit, and a control unit for controlling the acquisition of a right to use the engine controller with the printer controller.

According to still another aspect, the present invention which achieves these objectives relates to a method for controlling a reader controller for controlling an original-reading device for outputting image data by reading an image of an original. The method includes the steps of receiving image data and a command for setting an operation from a printer controller for forming image data from printing data transferred from an external apparatus, transmitting image data and a command for setting an operation to an engine controller for controlling an image forming mechanism for forming an image on a sheet based on image data, selecting one of the image data output from the original-reading device and the image data received from the printer controller as the image data to be transmitted in the transmitting step, and controlling the acquisition of a right to use the engine controller with the printer controller.

According to still another aspect, the present invention which achieves these objectives relates to an image processing apparatus including an engine controller for controlling an image forming mechanism for forming an image on a sheet based on image data, a printer controller for forming image data from printing data transferred from an external apparatus, for transmitting the image data to the engine controller, and for transmitting a command for setting an operation of the engine controller to the engine controller, and a reader controller for controlling an original-reading device for outputting image data by reading an image of an original, and for transmitting the image data output from the original-reading device to the engine controller. The reader controller is provided between the printer controller and the engine controller so as to be communicatable with each of the printer controller and the engine controller, analyzes the command transmitted from the printer controller, and transmits a command to the engine controller in accordance with a result of the analysis.

According to still another aspect, the present invention which achieves these objectives relates to a reader controller for controlling an original-reading device for outputting image data by reading an image of an original. The reader controller includes a reception unit for receiving image data and a command for setting an operation from a printer controller for forming image data from printing data transferred from an external apparatus, a transmission unit for transmitting image data and a command for setting an operation to an engine controller for controlling an image forming mechanism for forming an image on a sheet based on image data; a selection unit for selecting one of the image data output from the original-reading device and the image data received from the printer controller as the image data to be transmitted from the transmission unit, and a generation unit for analyzing the command transmitted from the printer controller and for generating a command to be transmitted to the engine controller in accordance with a result of the analysis.

According to still another aspect, the present invention which achieves these objectives relates to a method for controlling a reader controller for controlling an original-reading device for outputting image data by reading an image of an original. The method includes the steps of receiving image data and a command for setting an operation from a printer controller for forming image data from printing data transferred from an external apparatus, transmitting image data and a command for setting an operation to an engine controller for controlling an image forming mechanism for forming an image on a sheet based on image data, selecting one of the image data output from the original-reading device and the image data received from the printer controller as the image data to be transmitted in the transmitting step, and analyzing the command transmitted from the printer controller and generating a command to be transmitted to the engine controller in accordance with a result of the analysis.

The foregoing and other objects, advantages and features of the present invention will become more apparent from the following description of the preferred embodiment taken in conjunction with the accompanying drawings.

BRIEF DESCRIPTION OF THE DRAWINGS

FIG. 4 is a block diagram illustrating the configuration of the reader controller shown in FIG. 3;

FIG. 12 is a block diagram illustrating the configuration of another reader controller which replaces the reader controller shown in FIG. 4;

FIG. 13 is a diagram illustrating signals exchanged between a printer controller and a DC controller in a laser-beam printer;

FIG. 14 is a table illustrating a summary of the name and the direction of each signal exchanged between the printer controller and the DC controller;

DESCRIPTION OF THE PREFERRED EMBODIMENT

A preferred embodiment of the present invention will now be described with reference to the drawings.

Figure 15:
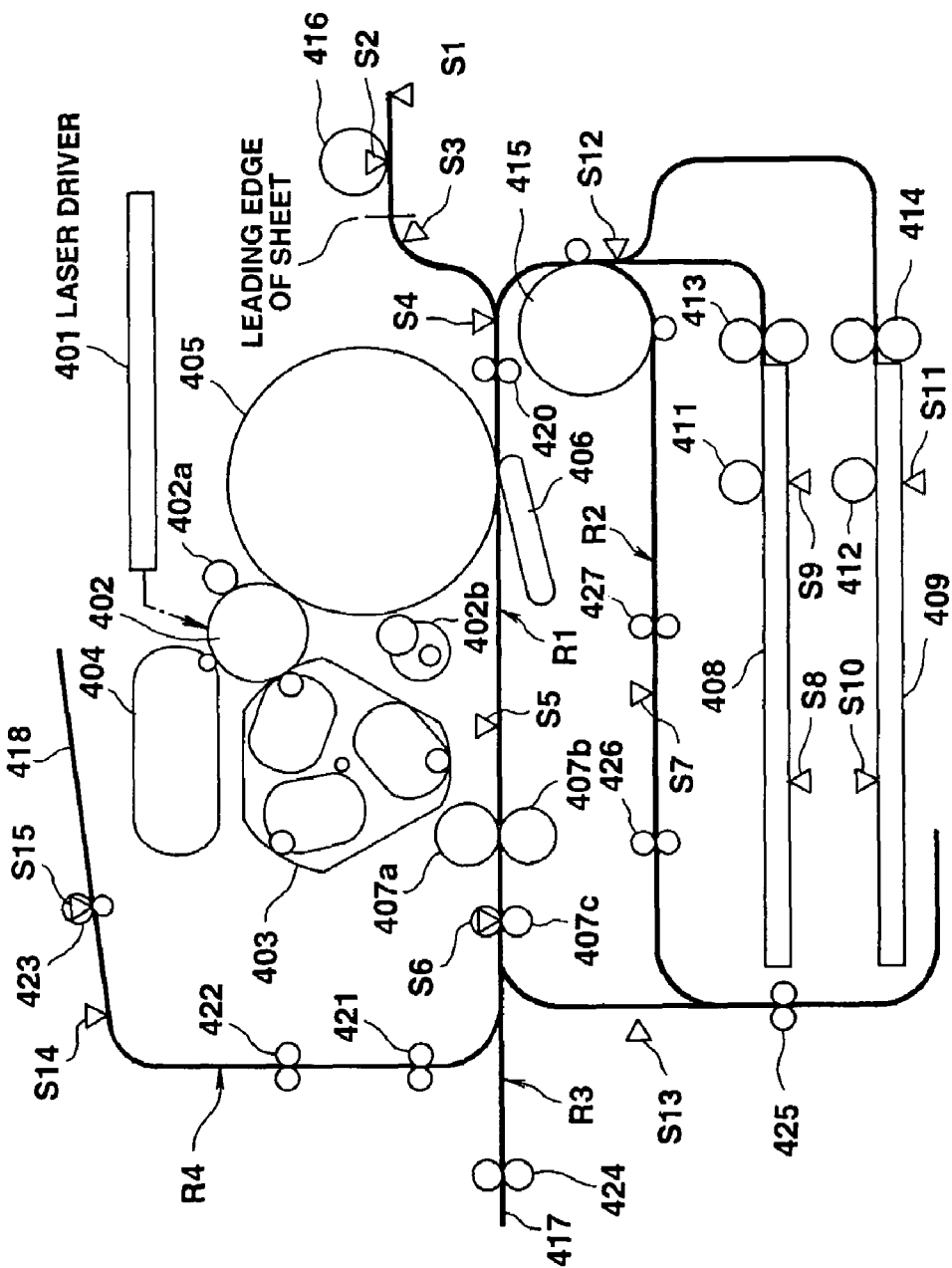
FIG. 15 is a diagram illustrating the configuration of an image forming mechanism within the laser-beam printer.

First, a description will be provided of an image forming mechanism within a laser-beam printer to which the present invention is applied, with reference to FIG. 15. FIG. 15 is a diagram illustrating the configuration of the image forming mechanism within the laser-beam printer to which the present invention is applied.

The image forming mechanism includes a mechanism for forming an electrostatic latent image on a photosensitive drum by laser-beam scanning, a mechanism for developing the electrostatic latent image, an optical processing mechanism for transferring the latent image onto a printing sheet, a fixing processing mechanism for fixing a toner image transferred onto the printing sheet, a printing-sheet feeding processing mechanism, and a printing-sheet conveying processing mechanism.

More specifically, as shown in FIG. 15, an optical processing mechanism 401 includes a laser driver for performing on/off driving of a laser beam emitted from a semi=conductor laser in accordance with an image signal supplied from a printer controller. The laser beam emitted from the semiconductor laser is deflected in a main scanning direction by a (rotating) polygonal mirror. The laser beam deflected in the main scanning direction is guided to a photosensitive drum 402 via a reflecting mirror to expose the surface of the photosensitive drum 402 in the main scanning direction.

An electrostatic latent image is formed on the photosensitive drum 402 by scanning exposure of the laser beam. The formed latent image is developed to provide a toner image by toners supplied from developing units 403 and 404. Toners having colors of Y (yellow), M (magenta) and C (cyan) are supplied from the developing unit 403, and a toner having a color of K (black) is supplied from the developing unit 404. When an image to be printed is a black-and-white image, developing processing only by the developing unit 404 is performed. When an image to be printed is a color image, developing processing by the developing units 403 and 404 is performed.

The toner image formed on the photosensitive drum 402 is transferred onto an intermediate transfer member 405 rotating in a direction opposite to the direction of rotation of the photosensitive drum 402. When an image to be printed is a black-and-white image, the transfer of a black toner image from the photosensitive drum 402 onto the intermediate transfer member 405 is completed by a single rotation of the intermediate transfer member 405. When an image to be printed is a color image, the transfer of a four-color toner image from the photosensitive drum 402 onto the intermediate transfer member 405 is completed by four rotations of the intermediate transfer member 405.

The toner image on the intermediate transfer member 405 is transferred onto a printing sheet fed by the sheet feeding processing mechanism while being synchronized in a sub-scanning direction. More specifically, the printing sheet is fed between the intermediate transfer member 405 and a transfer belt 406, which conveys the printing sheet while being synchronized in the sub-scanning direction. The toner image on the intermediate transfer member 405 is transferred onto the printing sheet while the printing sheet is conveyed. Upon completion of the transfer of the toner image from the intermediate transfer member 405 onto the printing sheet, the surface of the intermediate transfer member 405 is cleaned by a cleaner 402b.

The fixing processing mechanism includes a fixing unit for fixing the toner image transferred onto the printing sheet by heat and pressure. The fixing unit includes a fixing roller 407a and a pressing roller 407b. A heater for heating the toner image is provided in the fixing roller 407a. The heater is controlled by the DC controller 2002 (shown in FIG. 1) so as to provide a predetermined fixing temperature. The printing sheet having the image fixed thereon is discharged outside the fixing unit by a pair of discharging rollers 407c.

The printing sheet feeding mechanism includes an upper cassette 408 and a lower cassette 409 for accommodating printing sheets, and a tray for manual insertion of a sheet so as to selectively feed a printing sheet in the cassettes and the tray.

The upper and lower cassettes 408 and 409 are mounted in the main body of the printer. Each of the cassettes includes a size detection mechanism for electrically detecting the size of printing sheets in accordance with a moved position of a partition plate (not shown), and corresponding ones of sheet-absence sensors S8–S11 (the sensors S8 and S9 in the upper cassette 408, and the sensors S10 and S11 in the lower cassette 409) for detecting the absence of a printing sheet. The uppermost printing sheet is conveyed from the upper cassette 408 or the lower cassette 409 to a sheet feeding roller 415 by the rotation driving of a pickup roller 411 or 412, and a sheet feeding roller 413 or 414, respectively. Each of the pickup rollers 411 and 412 is subjected to intermittent rotation driving by a driving means (not shown) at every sheet feeding operation to feed a printing sheet at every rotation of the corresponding one of the pickup roller 411 and 412.

A sheet feeding roller 415 conveys the fed printing sheet based on the output of a fed-sheet sensor S12 until the leading edge of the sheet reaches a position corresponding to registration rollers 420. Whether or not the leading edge of the printing sheet reaches the position corresponding to the registration rollers 420 is determined based on the output of a registration sensor S4. The registration rollers 420 perform stop and release of feeding of the fed printing sheet. The operation of the registration rollers 420 is controlled so as to be synchronized with sub-scanning of the laser beam.

The manual insertion tray is provided in the main body of the printer. A printing sheet mounted on the manual insertion tray by the user is fed toward the registration rollers 420 by a sheet feeding roller 416 based on the detection outputs of manually-inserted-sheet sensors S1 and S2. The printing sheet fed from the manual insertion tray toward the registration rollers 420 is detected based on the output of a sheet sensor S3.

The printing-sheet conveying processing mechanism includes a transfer belt 406 for conveying the printing sheet conveyed by the registration rollers 420 toward the fixing unit via the intermediate transfer member 405, respective pairs of conveying rollers 421, 422 and 423 for guiding the printing sheet discharged from the fixing unit to a discharged-sheet tray (face-down tray) 418 formed on an upper portion of the main body of the printer along a conveying path R4, a pair of conveying rollers 424 for guiding the printing sheet discharged from the fixing unit to the sorter 2005 (shown in FIG. 1) or a connecting port 417 with a face-up tray along a conveying path R3, a pair of reversal rollers 425 for switching the printing suface of the printing sheet from one surface to another surface, respective pairs of conveying rollers 426 and 427 for again guiding the printing sheet whose printing surface has been switched from the one surface to the other surface to the sheet feeding roller 415 along a duplex-sheet conveying path R2, and driving means (not shown) for driving the conveying rollers 421, 422, 423, 424, 426 and 427, and the reversal rollers 425.

A sheet sensor S5 for detecting the presence of a printing sheet on a conveying path R1 from the intermediate transfer member 405 to the fixing unit is provided at a portion of the conveying path R1. A discharged-sheet sensor S14 for detecting discharge of a printing sheet is provided at a portion of the conveying path R4. A detection sensor S15 for detecting the state of mounting of a printing sheet discharged onto the discharged-sheet tray 418 is provided at the entrance of the discharged-sheet tray 418. A sheet sensor S13 for detecting a printing sheet whose printing surface has been reversed is provided at a portion of a conveying path from the discharging rollers 407c to the reversal rollers 425. A duplex-sheet sensor S7 for detecting a printing sheet present on the duplex-sheet conveying path R2 is provided at a portion of the duplex-sheet conveying path R2.

Next, a description will be provided of signals exchanged between a printer controller and a DC controller of the laser-beam printer via a video I/F with reference to FIGS. 13 and 14. FIG. 13 is a diagram illustrating signals exchanged between the printer controller and the DC controller in the laser-beam printer. FIG. 14 is a table illustrating a summary of the name and the direction of each signal exchanged between the printer controller and the DC controller shown in FIG. 13.

As shown in FIG. 13, signals exchanged between the printer controller 2103 and the DC controller 2002 are /PPRDY203, /CPRDY204, /RDY205, /PRNT206, /TOP207, /LSYNC208, /VCLK209, /VDOEN210, /VD0211, /CCLK212, /CBSY213, /CMD214, /SBSY215, /STS216 and /CCRT217. The names of these signals are shown in FIG. 14.

The signal /PPRDY203 is output after completing processing, such as initialization after turning on the power supply, and indicates that the DC controller 2002 is in a standby state of being communicatable with the printer controller 2103. The signal /CPRDY204 is output after completing processing, such as initialization after turning on the power supply, and indicates that the printer controller 2103 is in a state of being communicatable with the DC controller 2002.

The signal /RDY205 indicates whether or not the DC controller 2002 is in a standby state of being capable of performing a printing operation, and assumes "TRUE" when states relating to the respective processing for the printing operation satisfy preset conditions. For example, if states relating to the respective processing for the printing operation satisfy conditions such that the temperature of the inside of the fixing unit reaches a predetermined temperature, a sheet does not remain within the main body 2001 of the printer, the polygonal mirror is rotating at a predetermined speed, and the like, the signal /RDY205 assumes "TRUE".

The signal /PRNT206 is used for the request of the start or continuation of a printing operation provided from the printer controller 2103 to the DC controller 2002. The signal /TOP207 is a synchronizing signal, serving as a reference for vertical scanning of an image, transmitted from the DC controller 2002 to the printer controller 2103, and is output after a predetermined time period after the output of the signal /PRNT206. The signal /LSYNC208 is a synchronizing signal, serving as a reference for horizontal scanning for the printer controller 2103, transmitted from the DC controller 2002 to the printer controller 2103, and is output after a predetermined time period after the output of the signal /PRNT206 as the signal /TOP207.

The signal /VCLK209 is a synchronizing clock signal for the output of the signals/VDOEN210 and/VDO211 generated by the printer controller 2103, and has a frequency corresponding to the image signal. The signal /VDOEN210 is output from the printer controller 2103 in order to control the reception of the image signal by the DC controller 2002. The signal /VDO211 represents image data, which is output from the printer controller 2103 making the signals /TOP207 and /LSYNC208 references for vertical scanning and horizontal scanning, respectively, in synchronization with the signal /VCLK209.

The singal /CCLK212 is a synchronizing clock signal for the printer controller 2103 to obtain synchronism of serial communication performed with the DC controller 2002. The signal /CBSY213 is a strobe signal for outputting the signal /CMD214, serving as a command signal. The signal /CMD214 is a command signal for the printer controller 2103 to perform an instruction to the DC controller 2002.

The signal /SBSY215 is a signal for outputting the signal /STS216. The signal /STS216 is a signal indicating the internal status of the DC controller 2002 output in response to the signal /CMD214.

The signal /CCRT217 is a signal for notifying the printer controller 2103 of a change in the internal status of the DC controller 2002 when the internal status has changed. For example, upon reception of the signal /CCRT217, the printer controller 2103 provides a command to ask the contents of the change in the internal status of the DC controller 2002. The DC controller 2002 notifies the printer controller 2103 of the received contents using the signal /STS215 in response to the command.

Figure 16:
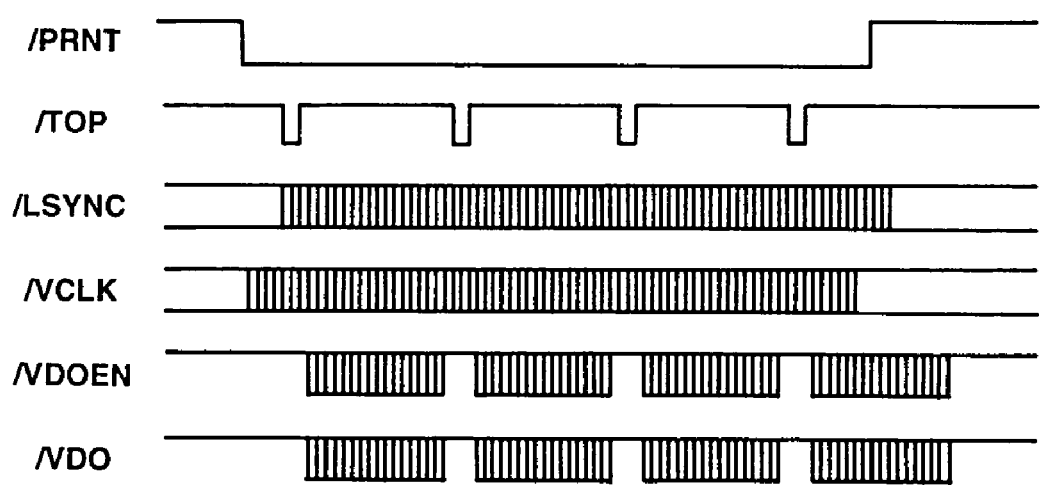
FIG. 16 is a timing chart illustrating image-data transmission timings in the laser-beam printer.
Figure 17:
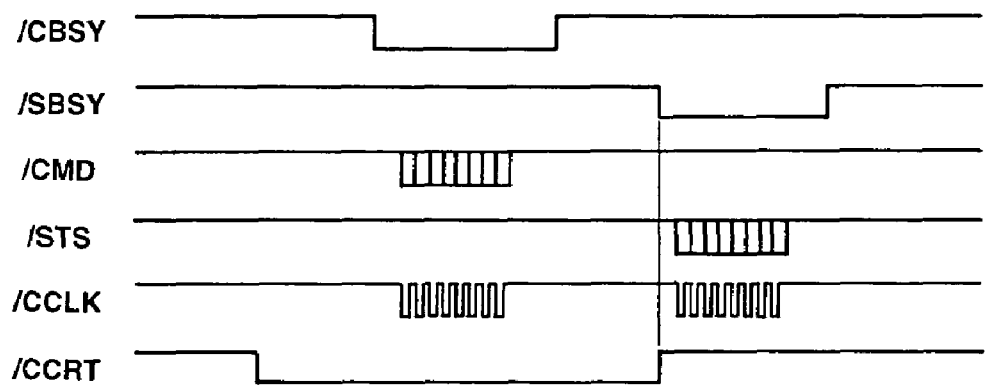
FIG. 17 is a timing chart illustrating timings in serial communication in the laser-beam printer.

Next, a description will be provided of timings of signals exchanged between the printer controller 2103 and the DC controller 2002 with reference to FIGS. 16 and 17. FIG. 16 is a timing chart illustrating timings of transmission of image data in the laser-beam printer. FIG. 17 is a timing chart illustrating timings in serial communication in the laser-beam printer.

Upon completion of the preparation of transmission of image data in the printer controller 2103, then, as shown in FIG. 16, first, a Low (TRUE)/PRNT206 signal is transmitted to the DC controller 2002, and at the same time, a /VCLK209 signal used for the transfer of the image data is generated.

In response to these signals, the DC controller 2002 performs various settings within the printer, and outputs /TOP207 and /LSYNC208 signals to the printer controller 2103 when a state of being capable of receiving the image data has been provided. The printer controller 2103 transfers a /VDOEN210 signal to the DC controller 2002 together with a /VD0211 signal making /TOP207 and /LSYNC208 signals references.

Next, a description will be provided of timings in serial communication performed during a printing operation with reference to FIG. 17.

First, a case in which a /CCRT217 signal is not used will be described. When the printer controller 2103 transmits a command to the DC controller 2002, as shown in FIG. 17, the printer controller 2103 makes a /CBSY213 signal Low (TRUE), and transmits a /CMD214 signal to the DC controller 2002 in synchronization with a /CCLK212 signal. Upon reception of the /CMD214 signal, the DC controller 2002 first confirms that the /CBSY213 signal assumes High (FALSE), and then makes the /SBSY215 signal Low (TRUE) and transmits status data of the engine side corresponding to the command as a /STS216 signal in synchronization with a /CCLK212 signal. Upon reception of the /STS216 signal, the printer controller 2103 continues or interrupts the control of printing in accordance with the contents indicated by the /STS216 signal.

Next, a case in which a /CCRT217 signal is used will be described. A /CCRT217 signal assumes Low (TRUE) when a change occurs in the state of the engine side assigned in advance by the printer controller 2103. For example, assume that the printer controller 2103 has made a setting in advance using a /CMD214 signal so as to make the /CCRT217 signal effective when the absence of a sheet occurs.

In this set condition, for example, if the printer controller 2103 provides a request to perform printout on two sheets when only one sheet remains, a printing operation is normally executed without causing any problem. However, the second printing sheet is absent in the second printing operation. Accordingly, the DC controller 2002 detects a change in the state when image formation on the second sheet has been started, and makes the/CCRT217 signal from High to Low. Upon reception of the Low /CCRT217 signal, in order to confirm which cassette is in the state of the absence of a sheet, the printer controller 2103 transmits a command (/CMD214) to request a status of the presence/absence of a sheet in a sheet feeding unit to the DC controller 2002. In response to this command, the DC controller 2002 transmits a /STS216 signal indicating the status of the cassette where no sheet is present to the printer controller 2103. The /CCRT217 signal is cleared to High at the timing of making a /SBSY215 signal Low.

Figure 18:
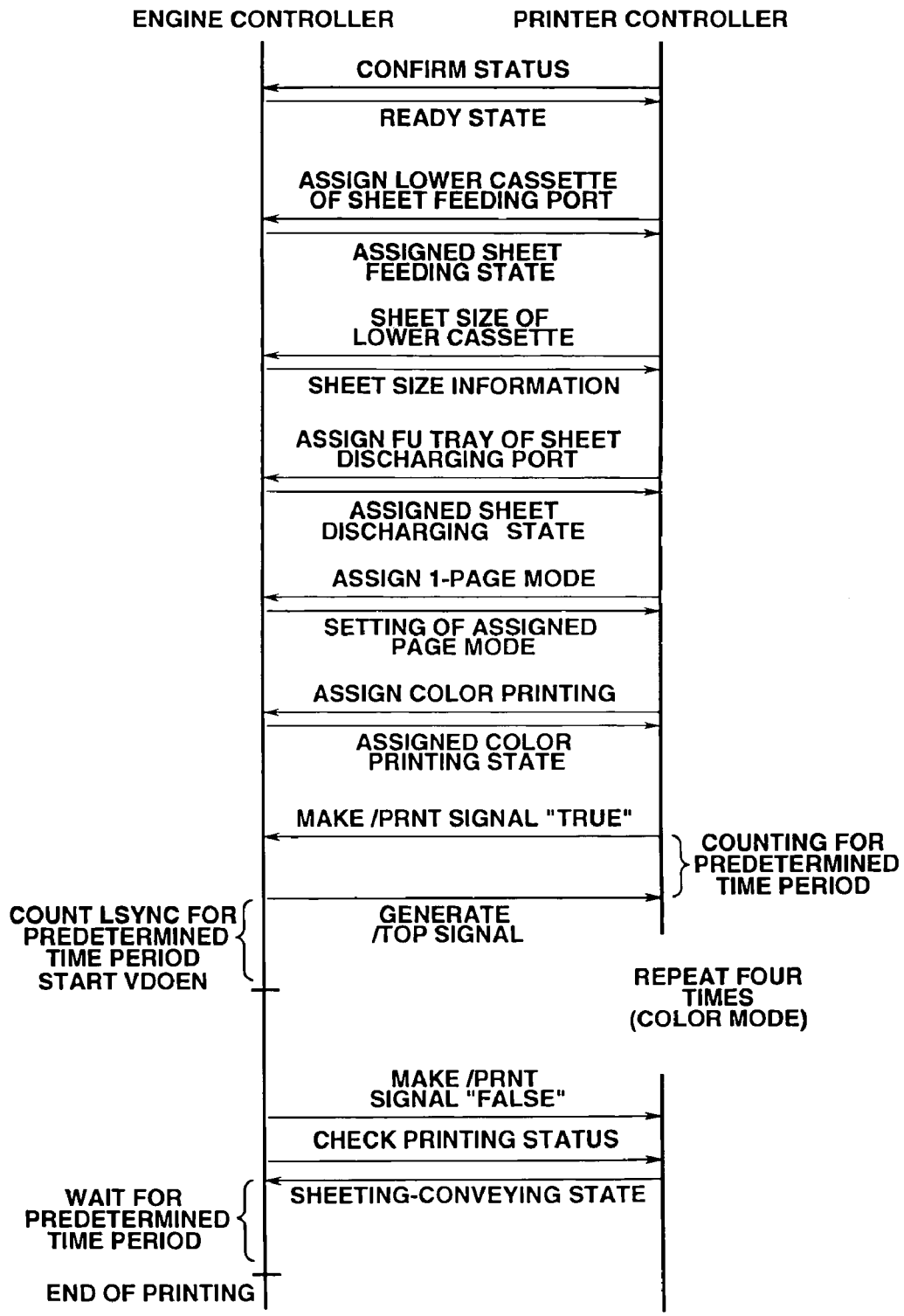
FIG. 18 is a timing chart for commands/statuses exchanged between the printer controller and the DC controller during a color printing operation.
Figure 19:
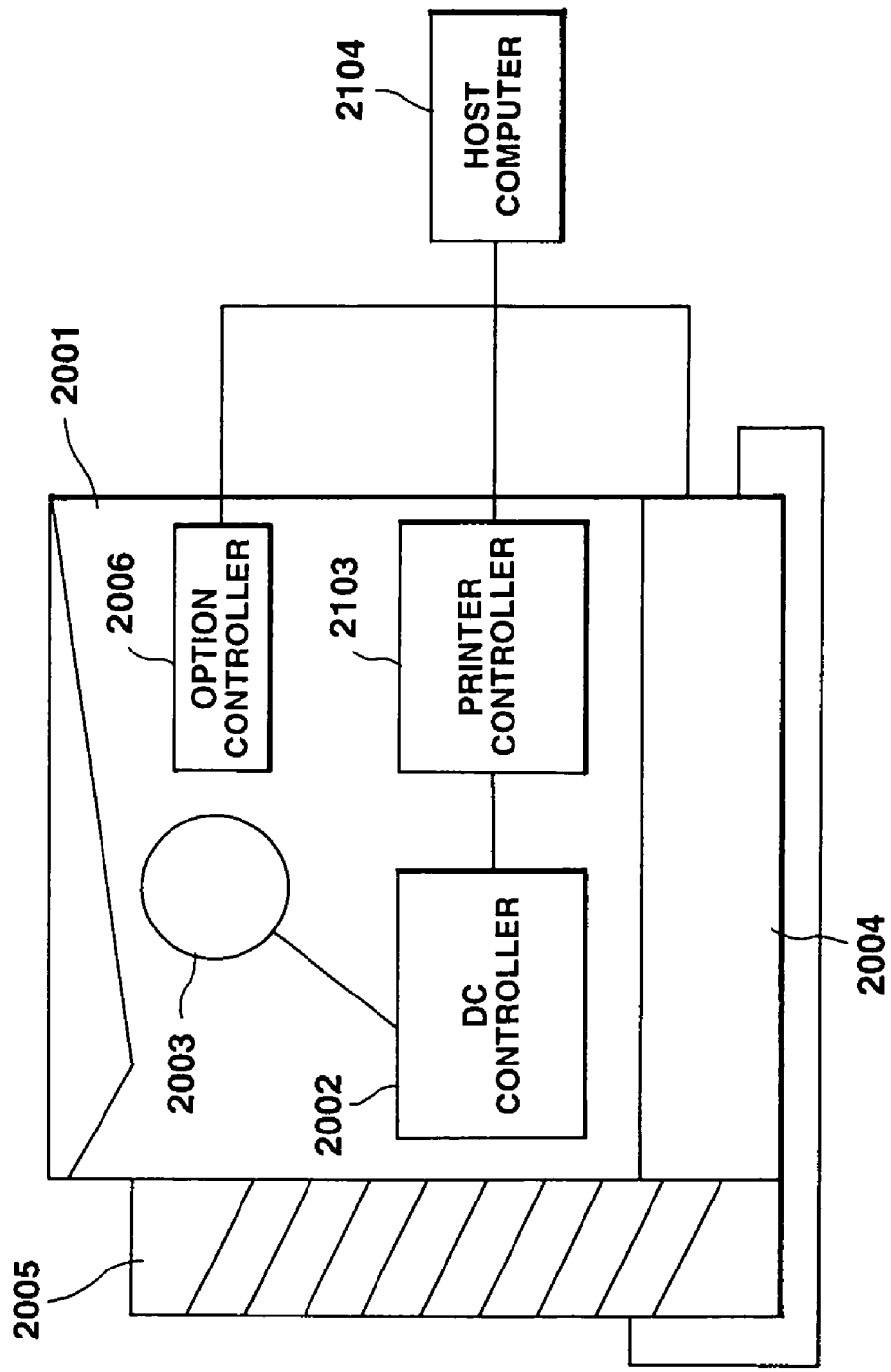
FIG. 19 is a schematic block diagram illustrating the configuration of a conventional laser-beam printer.
Figure 20:
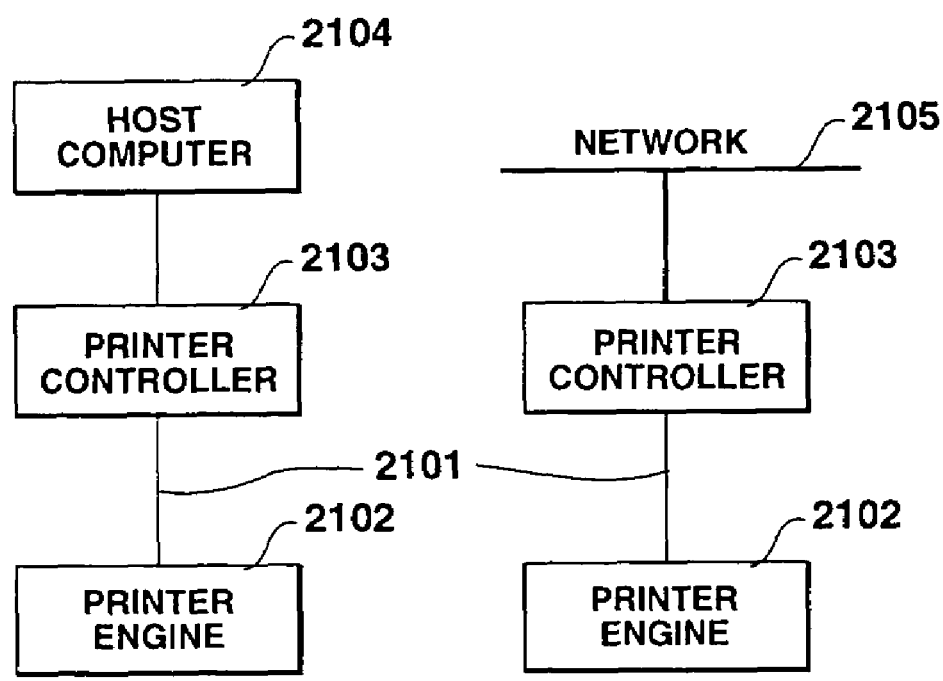
FIG. 20 is a block diagram illustrating the state of use of the laser-beam printer shown in FIG. 19.
Figure 21:
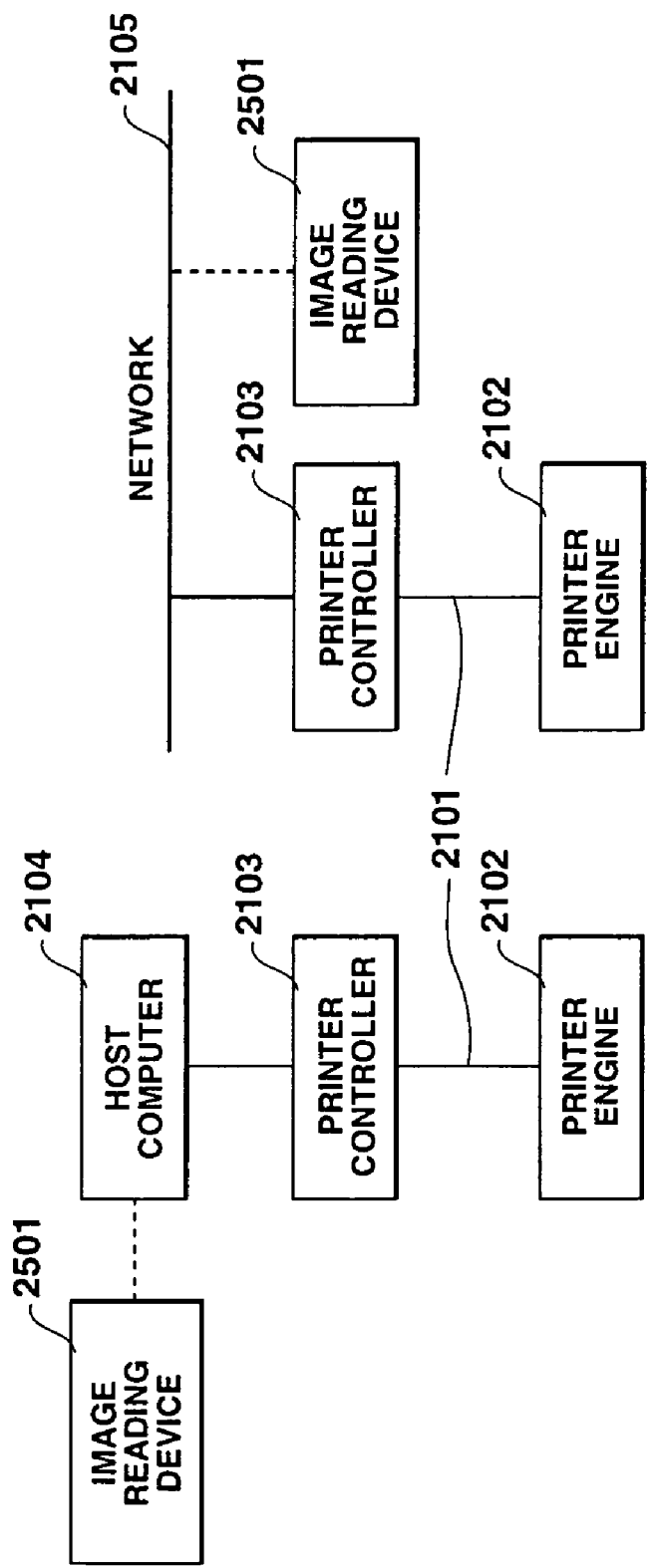
FIG. 21 is a block diagram illustrating a method for realizing a copying function by a laser-beam printer by being combined with an image reading device and a host computer.
Figure 22:
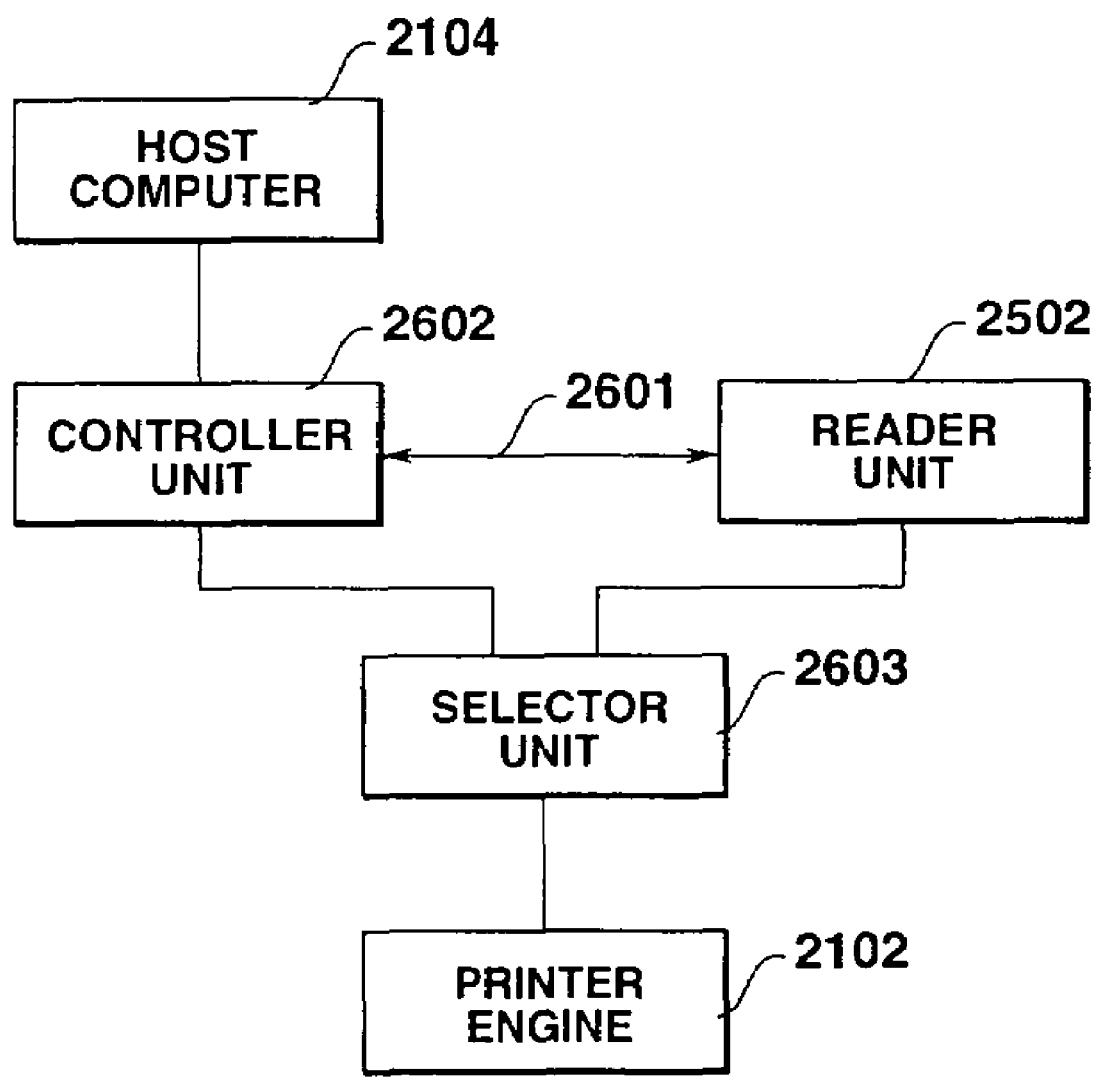
FIG. 22 is a block diagram illustrating the configuration of a composite apparatus having a printer function and a copying function obtained by incorporating an image reading device in a laser-beam printer.

Next, a description will be provided of a color printing operation with reference to FIG. 18. FIG. 18 is a timing chart for commands/statuses exchanged between the printer controller 2103 and the DC controller 2002 during a color printing operation.

When a request to start a printing operation has been generated, as shown in FIG. 18, the printer controller 2103 confirms the printer status from the DC controller 2002 while performing, for example, processing of converting image data. In response to this confirmation, the DC controller 2002 transmits a status indicating a ready state.

Upon confirmation of the ready state, the printer controller 2103 provides a command to assign a sheet feeding cassette (for example, the lower cassette), and then a command to request the size of recording sheets accommodated within the assigned cassette. In response to this series of commands, corresponding statuses (for example, a state of assigned sheet feeding, and information relating to the size of sheets) are transmitted from the DC controller 2002.

Then, the printer controller 2103 provides a command to assign a sheet discharging port (for example, the face-up (FU) discharged-sheet tray). In response to this command, the DC controller 2002 transmits a status indicating a state of sheet discharge at the assigned sheet discharging port. Then, a page-mode assigning command to assign the number of pages of prints is provided. In response to this command, a status of setting the assigned page mode is transmitted. Finally, a command to assign monochromatic/color printing is provided. In response to this command, a corresponding status is transmitted. In the present case, it is assumed that a color printout is assigned. All settings at the DC controller side, i.e., for the printer side, are terminated.

Then, the printer controller 2103 transmits a Low (TRUE)/PRNT206 signal to the DC controller 2002. In response to this signal, the DC controller 2002 transmits a /TOP207 signal after a predetermined time period. Upon reception of the /TOP207 signal, the printer controller 2103 outputs a /VDO211 signal to the DC controller 2002 by making /TOP207 and /LSYNC208 signals references for vertical scanning and horizontal scanning, respectively, in synchronization with a /VCLK2209 signal. Since the color mode is set, /TOP207 signals are generated four times to form an image having four colors, i.e., C, M, Y and K.

After the generation of the last /TOP207 signal, the /PRNT206 signal is returned to High (FALSE). According to this /PRNT206 signal, the DC controller 2002 detects the end of the request of printing and the process proceeds to postprocessing, such as an operation of cleaning the intermediate transfer member 405 (shown in FIG. 15). Substantially simultaneously with the shift to the postprocessing, the printing sheet having the toner image transferred thereto passes through the fixing unit and is discharged onto the assigned sheet discharging port.

When the printer controller 2103 confirms from the DC controller 2002 a state in which a sheet is not conveyed, i.e., the end of sheet discharge, the printing operation is terminated, and the printer controller 2103 awaits the next printing operation in a ready state until the next printing operation is started.

If an abnormal state, such as a jam of a printing sheet, the absence of a sheet, the opening of the door by the user, or the like, occurs during the above-described operation, the DC controller 2002 notifies the printer controller 2103 of the occurrence of abnormality using a /CCRT217 signal, and the printer controller 2103 performs processing for the occurred abnormality.

Figure 1:
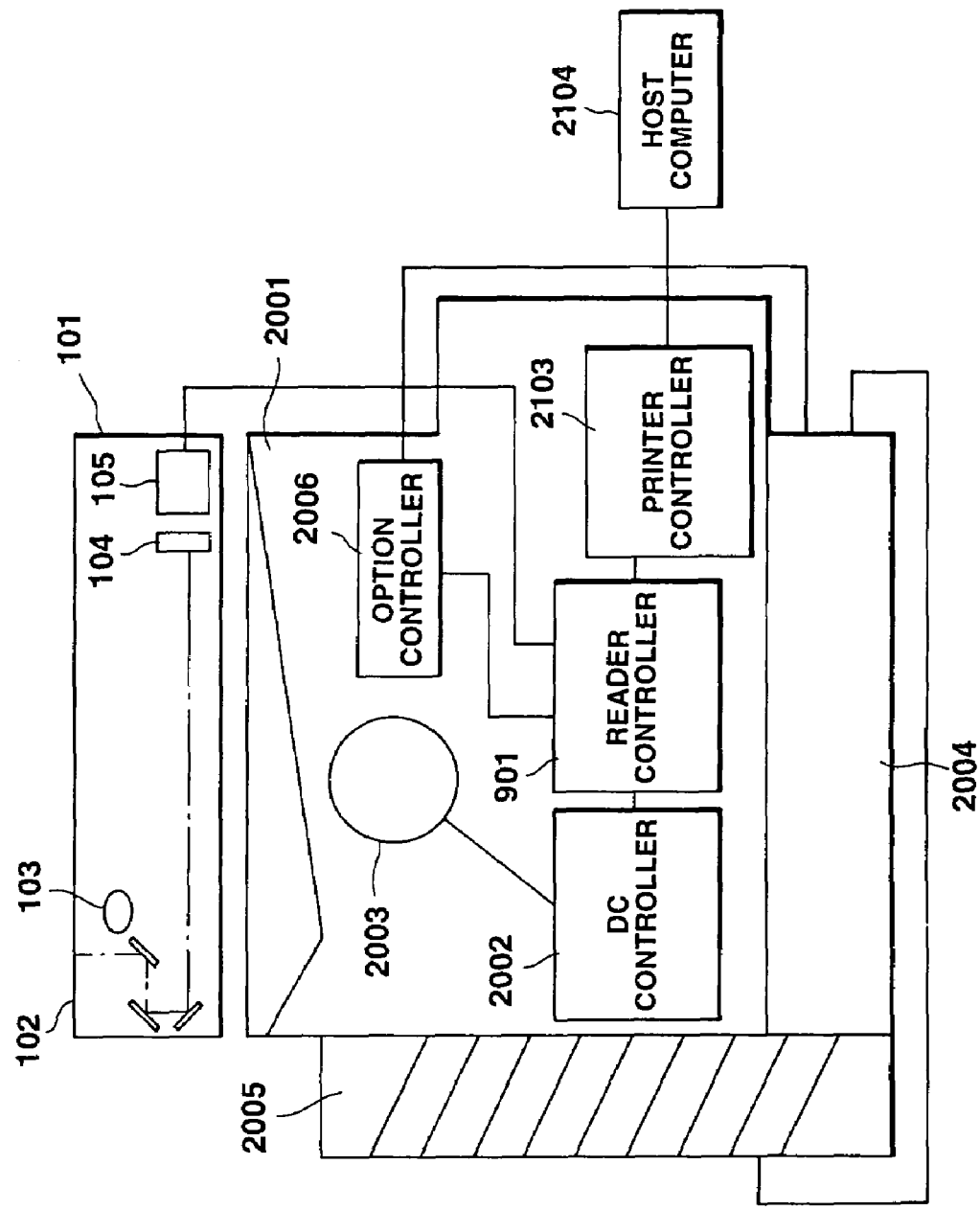
FIG. 1 is a schematic diagram illustrating the configuration of an image forming apparatus according to an embodiment of the present invention.
Figure 2:
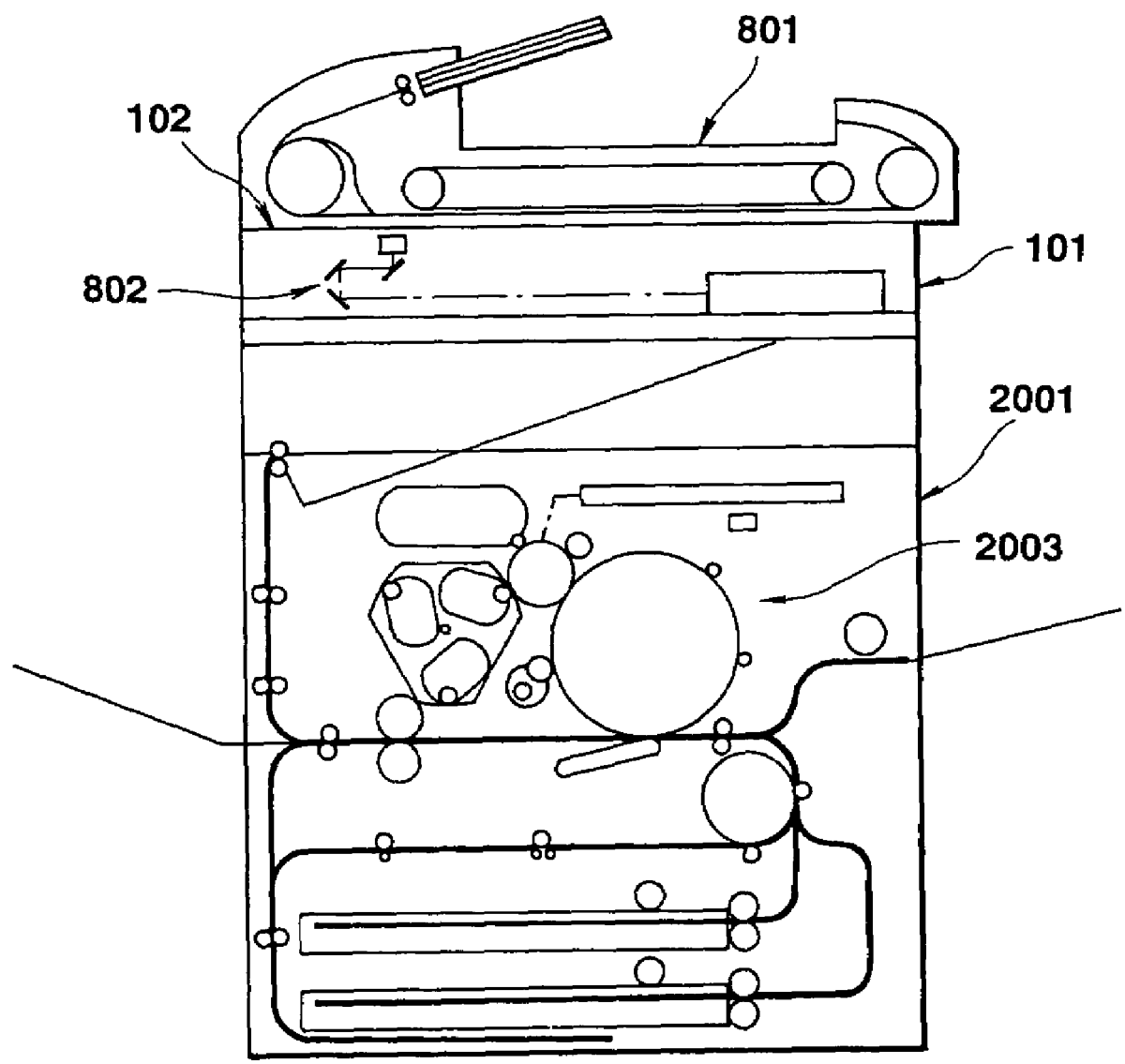
FIG. 2 is a diagram illustrating a state in which an optional automatic original-conveying device is mounted in an image reading device of the image forming apparatus shown in FIG. 1.

Next, a description will be provided of a composite image forming apparatus having a printer function and a copying function obtained by incorporating an image reading device in the above-described laser-beam printer. FIG. 1 is a schematic diagram illustrating the configuration of the image forming apparatus according to an embodiment of the present invention. FIG. 2 is a diagram illustrating a state in which an optional automatic original-conveying device is mounted in the image reading device of the image forming apparatus shown in FIG. 1.

As shown in FIG. 1, the image forming apparatus having both of the printer function and the copying function includes a DC controller 2002 for driving an image forming mechanism 2003 for executing a series of processing of conveying a sheet and forming an image represented by image data on the sheet, a printer controller 2103 for performing data processing of generating image data by processing printing data transferred from a host computer 2104, setting an operation for the DC controller 2002, transmitting image data at a predetermined timing corresponding to the DC controller 2002, and transmitting a command relating to the setting of the operation of the DC controller 2002, and a reader controller 901 for controlling a reading operation of an image reading device 101, performing predetermined processing for image data output from the image reading -device 101, and performing image data transmission of transmitting the image data at a predetermined timing corresponding to the DC controller 2002. The reader controller 901 is provided between the printer controller 2103 and the DC controller 2002, which are directly connected to each other in an ordinary laser-beam printer, so as to be communicatable with each of the controllers.

The image forming mechanism (engine) 2003, the DC controller 2002, the printer controller 2103 and the reader controller 901 are mounted in a main body 2001 of the apparatus together with an option controller 2006 (to be described later). Since the configuration of the image forming mechanism (engine) 2003 is the same as that shown in FIG. 15, a description thereof will be omitted.

An optional sheet feeding cassette 2004 and a sorter 2005 are also mounted in the main body 2001 of the printer. Driving operations for the optional sheet feeding cassette 2004 and the sorter 2005 are controlled by the option controller 2006. The option controller 2006 controls driving operations for the optional sheet feeding cassette 2004 and the sorter 2005 based on commands from the printer controller 2103.

The image reading device 101 includes an original-mount 102 on which an original to be read is mounted. Reading scanning is performed by projecting light onto a surface to be read of the original mounted on the original-mount 102 while moving a light source 103, and guiding reflected light from the surface to be read of the original to photoelectric conversion means 104. The phtoelectric conversion means 104 comprises an image pickup device, such as a CCD (charge-coupled device) or the like. An optical image guided to the photoelectric conversion means 104 is converted into an electrical signal according to photoelectric conversion. The obtained electrical signal is converted into a digital signal by analog-to-digital conversion means 105, and the obtained digital signal is output to the reader controller 901.

As shown in FIG. 2, an automatic original-conveying device 801 for sequentially conveying read originals mounted on an original-mounting tray to the original-mount 102 can be mounted on the image reading device 101. The automatic original-conveying device 801 conveys an original in synchronization with a scanning timing of an optical scanning unit 802. Upon completion of scanning, the original on the original-mount 102 is returned to the original-mounting tray.

Figure 3:
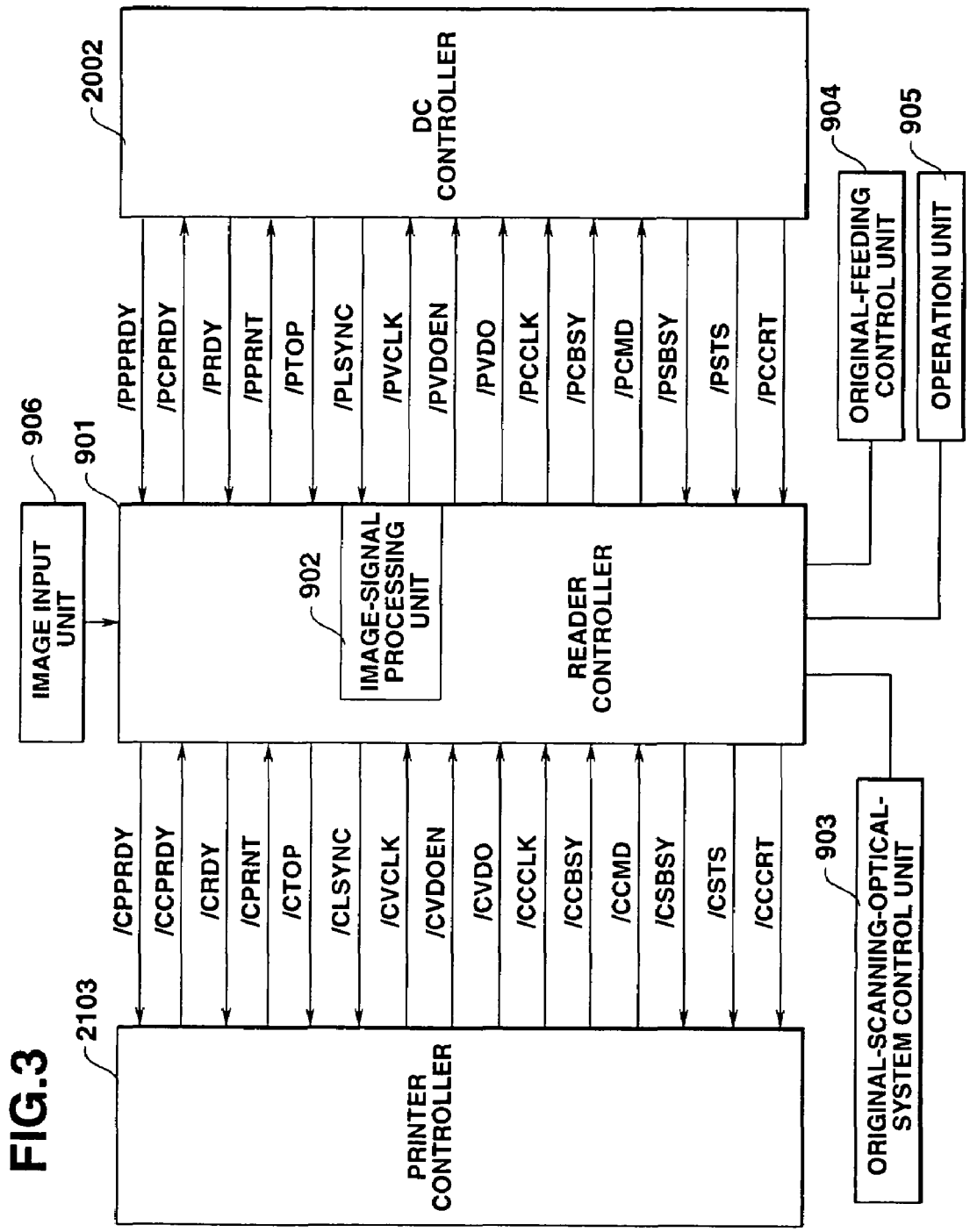
FIG. 3 is a diagram illustrating electrical connection between a reader controller and a printer controller and between the reader controller and a DC controller of the image forming apparatus shown in FIG. 1.

Next, a description will be provided of electrical connection between the printer controller 2103 and the reader controller 901 and between the reader controller 901 and the DC controller 2002 in the image forming apparatus, and the configuration of the reader controller 901 with reference to FIGS. 3 and 4. FIG. 3 is a diagram illustrating electrical connection between the printer controller 2103 and the reader controller 901 and between the reader controller 901 and the DC controller 2002 in the image forming apparatus shown in FIG. 1. FIG. 4 is a block diagram illustrating the configuration of the reader controller 901 shown in FIG. 3.

As shown in FIG. 3, the reader controller 901 receives image data output from the image reading device 101 via an image input unit 906. The received data is input to an image-signal processing unit 902 within the reader controller 901. The image-signal processing unit 902 performs predetermined processing for the received image data, and the processed image data is output at a predetermined timing corresponding to the DC controller 2002. The reader controller 901 controls a reading operation of the image reading device 101 and a conveying operation of the automatic original-conveying device 801 mounted in the image reading device 101. More specifically, in the control for the reading operation of the image reading device 101, a signal relating to the control is generated and is transmitted to an original-scanning-optical-system control unit 903. The original-scanning-optical-system control unit 903 drives an optical-system scanning unit 802 of the image reading device 101 based on a control signal from the reader controller 901. In the control for the conveying operation of the automatic original-conveying device 801, a signal relating to the control is generated, and is transmitted to the original-feeding control unit 904. The original-feeding control unit 904 drives the automatic original-conveying device 801 based on a control signal from the reader controller 901. An instruction, such as setting of a mode, or the like, by the user is input from an operation unit 905 to the reader controller 901.

The reader controller 901 is disposed between the printer controller 2103 and the DC controller 2002 so as to be communicatable with each of these controllers. Signals exchanged between the reader controller 901 and the printer controller 2103, and signals exchanged between the reader controller 901 and the DC controller 2002 have the same functions as the signals exchanged between the printer controller 2103 and the DC controller 2002 in the ordinary laser-beam printer shown in FIG. 13. However, signals exchanged between the reader controller 901 and the printer controller 2103, and signals exchanged between the reader controller 901 and the DC controller 2002 are signals physically different from each other. Accordingly, signals of the first type are represented by attaching C at the head of the name of each signal shown in FIG. 13, and signals of the second type are represented by attaching P at the head of the name of each signal shown in FIG. 13.

Next, a description will be provided of the configuration of the reader controller 901 with reference to FIG. 4.

As shown in FIG. 4, the reader controller 901 includes an image-signal processing unit 902 for performing predetermined processing for image data received from the image input unit 906. The image data output from the image-signal processing unit 902 is input to a selector 2201. The selector 2201 selects one of image data from the image-signal processing unit 902 and image data output from the printer controller 2103 and outputs the selected image data. More specifically, signals selectively output from the selector 2201 comprise signals /PVDO, /PVCLK and /PVDOEN representing image data. Each of these signals is supplied to the DC controller 2002.

Serial communication with the printer controller 2103 is performed via a serial communication controller 2205. The serial communication controller 2205 receives signals /CCCLK and /CCMD from the printer controller 2103, and outputs a signal /CSTS to the printer controller 2103. The exchange of signals for supplementing serial communication by the serial communication controller 2205 is performed via an input/output port 2206. Signals exchanged via the input/output port 2206 comprise signals /CPPRDY, /CCPRDY, /CRDY, /CPRNT, /CCBSY and /CSBSY.

Serial communication with the DC controller 2002 is performed via a serial communication controller 2202. The serial communication controller 2202 outputs signals /PCCLK and /PCMD to the DC controller 2002, and receives a signal /PSTS from the DC controller 2002. The exchange of signals for supplementing serial communication by the serial communication controller 2202 is performed via an input/output port 2203. Signals exchanged via the input/output port 2203 comprise signals /PPPRDY, /PCPRDY, /PRDY, /PPRNT, /PCBSY and /PSBSY.

A signal /PTOP output from the DC controller 2002 is input to an interrupt controller 2204 and a gate 2207. A signal /PCCRT is input to the interrupt controller 2204 together with the /PTOP signal, and the interrupt controller 2204 notifies a CPU 2209 of the generation of an interrupt event.

The gate 2207 performs an opening/closing operation for selecting whether or not the input /PTOP signal is to be output to the printer controller 2103 as a signal /CTOP. This opening/closing operation is controlled by the CPU 2209.

The /PCCRT signal output from the DC controller 2002 is input to a control circuit 2208. The control circuit 2208 controls the output of the /PCCRT (/CCCRT) signal to the printer controller 2103 based on an instruction from the CPU 2209, and directly transmits a /CCCRT signal to the printer controller 2103 by setting a flag without intervention of the DC controller 2002.

A signal /PLSYNC output from the DC controller 2002 is input to a gate 2210. The gate 2210 performs an opening/closing operation for selecting whether or not the input /PLSYNC signal is to be output to the printer controller 2103 as a signal /CLSYNC. This opening/closing operation is controlled by the CPU 2209.

The CPU 2209 performs controls for respective blocks in addition to the above-described controls.

Next, a color copying operation will be described.

When a copying start key on the operation unit 905 has been depressed, the reader controller 901 closes the gates 2207 and 2210, and the control circuit 2208, and controls the selector 2201 so as to select the signal from the image input unit 906.

Then, the reader controller 901 requests the DC controller 2002 to confirm a signal /PPRDY, i.e., a ready state of the printer, via the input/output port 2203. In response to this request, the DC controller 2002 provides a status indicating a ready state.

Upon confirmation of a ready state, various settings at the DC controller side, i.e., for the printer side, are performed.

More specifically, the reader controller 901 provides a command to assign a sheet feeding cassette (for example, the lower cassette), and then a command to request the size of recording sheets accommodated within the assigned cassette. In response to this series of commands, corresponding statuses (for example, a state of assigned sheet feeding, and information relating to the size of sheets) are transmitted from the DC controller 2002.

Then, the reader controller 901 provides a command to assign a sheet discharging port (for example, the face-up (FU) discharged-sheet tray). In response to this command, the DC controller 2002 transmits a status indicating a state of sheet discharge at the assigned sheet discharging port. Then, a page-mode assigning command to assign the number of pages of prints is provided. In response to this command, a status of setting the assigned page mode is transmitted. Finally, a command to assign monochromatic/color printing is provided. In response to this command, a corresponding status is transmitted.

Upon completion of all settings at the DC controller side, i.e., for the printer side, in the above-described manner, the reader controller 901 performs control for the automatic original-conveying device 801. According to this control, the original is conveyed onto the original-mount 102.

Then, the reader controller 901 transmits a Low (TRUE)/PPRNT signal, i.e., a request for printing, to the DC controller 2002. In response to this signal, the DC controller 2002 transmits a /PTOP signal after a predetermined time period. Upon reception of the /PTOP signal, the interrupt controller 2204 generates an interrupt event. The CPU 2209 instructs the original-scanning-optical-system control unit 903 to perform reading scanning of the image reading device

2501 in synchronization with the /PTOP signal based on the event generated from the interrupt controller 2204. According to the input of the /PTOP signal, the selector 2201 outputs a /PVDO signal from the image input unit 442 to the DC controller 2002 by making /PTOP and /PLSYNC signals references for vertical scanning and horizontal scanning, respectively, in synchronization with a /PVCLK signal. Since the color mode is set, /PTOP signals are generated four times to form an image having four colors, i.e., C, M, Y and K.

After the generation of the last /PTOP signal, the /PPRNT signal is returned to High (FALSE). According to this /PPRNT signal, the DC controller 2002 detects the end of the request of printing and the process proceeds to postprocessing, such as an operation of cleaning the intermediate transfer member 405 (shown in FIG. 15). Substantially simultaneously with the shift to the postprocessing, the printing sheet having the toner image transferred thereto passes through the fixing unit and is discharged onto the assigned sheet discharging port.

When the reader controller 901 confirms from the DC controller 2002 a state in which a sheet is not fed, i.e., the end of sheet discharge, the printing operation is terminated, and the reader controller 901 awaits the next printing operation in a ready state until the next printing operation is started.

Next, a description will be provided of a color printing operation.

Upon completion of the copying operation in the above-described manner, the reader controller 901 assumes a ready state. At that time, the reader controller 901 opens the gate 2207 and the control circuit 2208 for a job to be subsequently generated.

When a request to start a printing operation has been input, the reader controller 901 controls the selector 2201 so as to select the signal from the printer controller 2103.

Then, the reader controller 901 confirms a /PPRDY signal, i.e., a ready state of the printer, from the DC controller 2002 via the input/output port 2203. In response to this confirmation, the DC controller 2002 transmits a status indicating a ready state.

When the ready state of the DC controller 2002 has been confirmed, the reader controller 901 sets the /CRDY signal to TRUE via the input/output port 2206. Then, the printer controller 2103 performs communication for performing various kinds of settings at the DC controller side, i.e., for the printer side, with the reader controller 901. More specifically, commands for various kinds of settings output from the printer controller 2103 are received via the serial communication controller 2205. The contents of the received commands are interpreted by the CPU 2209. In accordance with the contents of the interpreted commands, commands indicating the same contents are transmitted via the serial communication controller 2202, and various kinds of settings for the DC controller side are performed according to the commands. Statuses corresponding to a series of commands are transmitted from the DC controllers 2002, and the transmitted statuses are received via the serial communication controller 2202. The received statuses are interpreted by the CPU 2209, and are then transmitted to the printer controller 2103 via the serial communication controller 2205.

Then, the printer controller 2103 transmits a Low (TRUE)/CPRNT signal, i.e., a request of a printing operation to the reader controller 901. Upon reception of the request, the reader controller 901 transmits a /PPRNT signal to the DC controller 2002. In response to the /PPRNT signal, a /PTOP signal is transmitted from the DC controller 2002 after a predetermined time period. The /PTOP signal passes through the gate 2207, and is transmitted to the printer controller 2103 as a /CTOP signal.

The printer controller 2103 transmits a /CVDO signal to the reader controller 901 in synchronization with a /CVCLK signal by making the /CTOP signal and a /CLSYNC signal passing through the gate 2210 references for vertical scanning and horizontal scanning, respectively. Respective signals including the /CVDO signal transmitted from the printer controller 2103 are transmitted to the DC controller 2002 via the selector 2201 as /PVDO, /PVCLK and /PVODEN signals.

Figure 11:
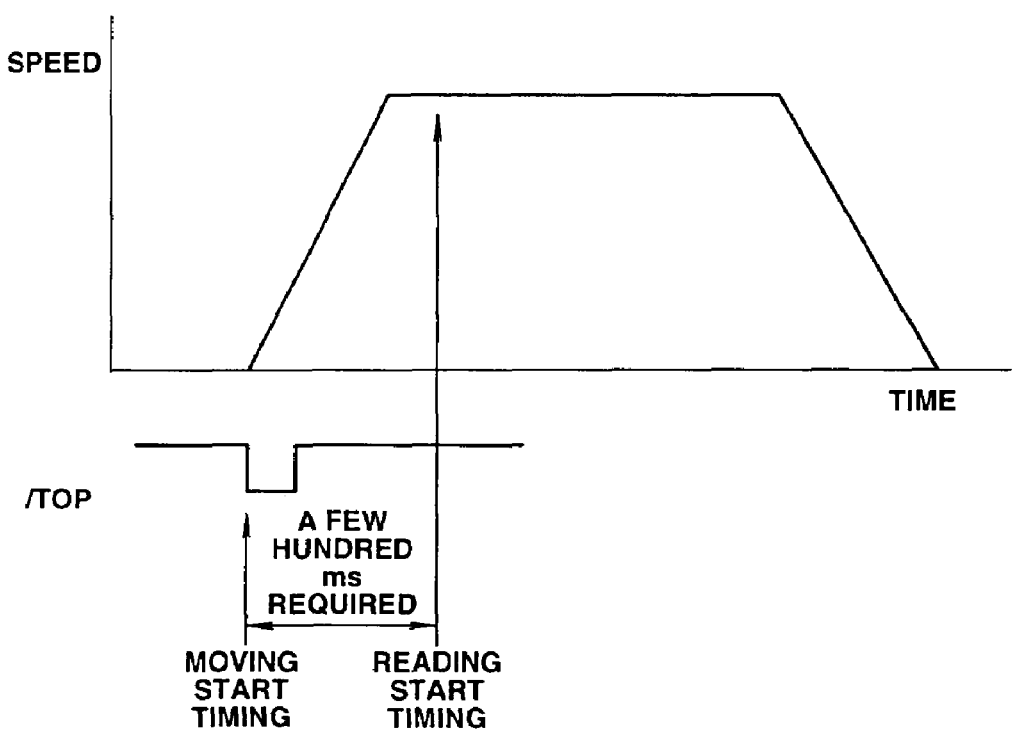
FIG. 11 is a diagram illustrating a difference in the data trasmission timing between a printing operation and a copying operation in the image forming apparatus shown in FIG. 1.

There is a difference in the image-data transmission timing between a printing operation and a copying operation. The difference will now be described with reference to FIGS. 11 and 12. FIG. 11 is a diagram illustrating a difference in the image-data transmission timing between a printing operation and a copying operation in the image forming apparatus shown in FIG. 1. FIG. 12 is a block diagram illustrating the configuration of another reader controller which replaces the reader controller shown in FIG. 4.

The printer controller 2103 includes an image memory for storing image data. Image data is transmitted after being first stored in the image memory. Accordingly, the printer controller 2103 transmits image data /CVDO to the DC controller 2002 after receiving a /CTOP signal. Hence, a time required from the reception of the /CTOP signal to the output of the /CVDO signal is an electrical delay time.

On the other hand, in a copying operation, when the reader controller 901 has received a /PTOP signal, control is performed so as to start the movement of the optical-system scanning unit of the image reading device 101. A time required from the reception of the /PTOP signal to the output of image data from the image reading device 101 is longer than a time required until the output of image data in a printing operation.

More specifically, as shown in FIG. 11, in order to make the optical-system scanning unit of the image reading device 101 from a stopped state to a state of being capable of performing original-reading scanning, a time to accelerate the optical-system scanning unit to a predetermined speed is required. For example, a time of about 100 ms is required. Accordingly, if a /PTOP signal is transmitted during a copying operation at the same timing as a /PTOP signal during a printing operation, the transmission timing of image data during the copying operation is delayed from the transmission timing of image data during the printing operation. Hence, in the present embodiment, in a copying operation, the DC controller 2002 outputs image-data earlier (for example, 100 ms) than during a printing operation, and reading scanning of the image reading device 101 is started substantially simultaneously when the reader controller 901 has received the /PTOP signal. It is thereby possible to make a time required until the output of image data from the image reading device 101 substantially the same as a time required until the output of image data during a printing operation.

In another method for making a time required from the reception of a /PTOP signal to the output of image data from the image reading device 101 substantially the same as a time required until the output of image data during a printing operation, a new signal for instructing the start of scanning of the image reading device 101 is generated in a copying operation. More specifically, as shown in FIG. 12, the DC controller 2002 provides a new signal /RSTART for instructing the start of scanning of the image reading device 101 by taking into consideration the delay time instead of the /PTOP signal during a copying operation, and transmits image data substantially simultaneously with the provision of the /RSTART signal. During a printing operation, the provision of the /PTOP signal is performed in the same manner as in the foregoing description.

Figure 6A:
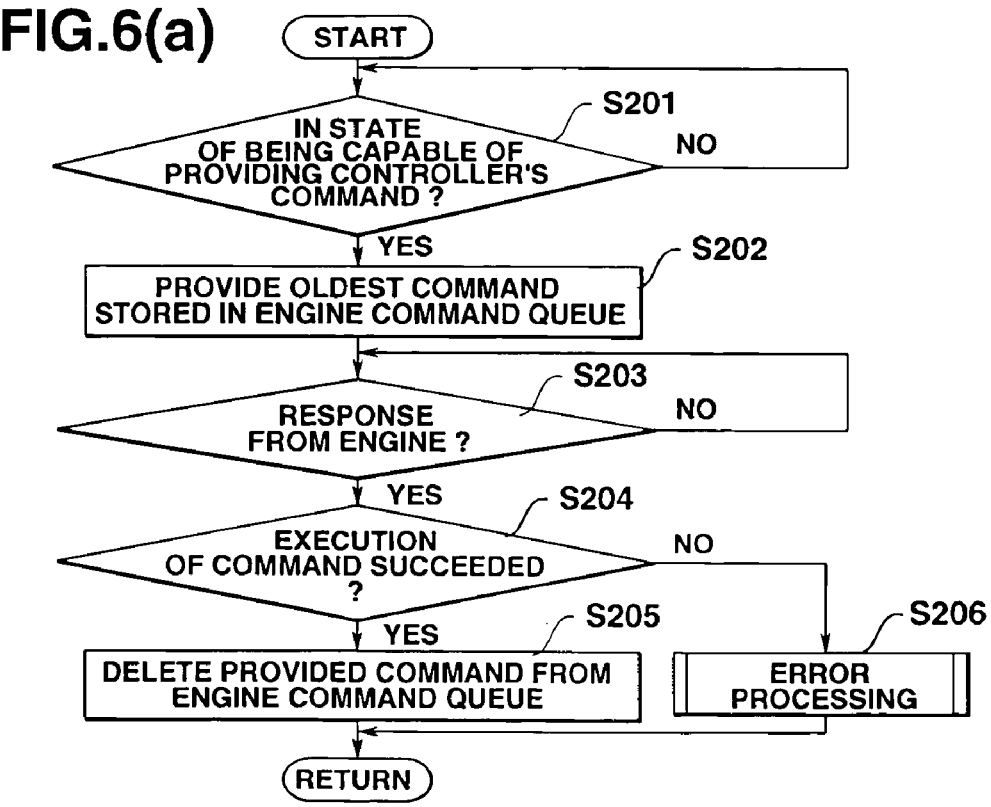
FIGS. 6(a) and 6(b) are flowcharts illustrating a communication operation of the reader controller for a request to change the sheet feeding cassette from the printer controller during a copying operation.
Figure 6B:
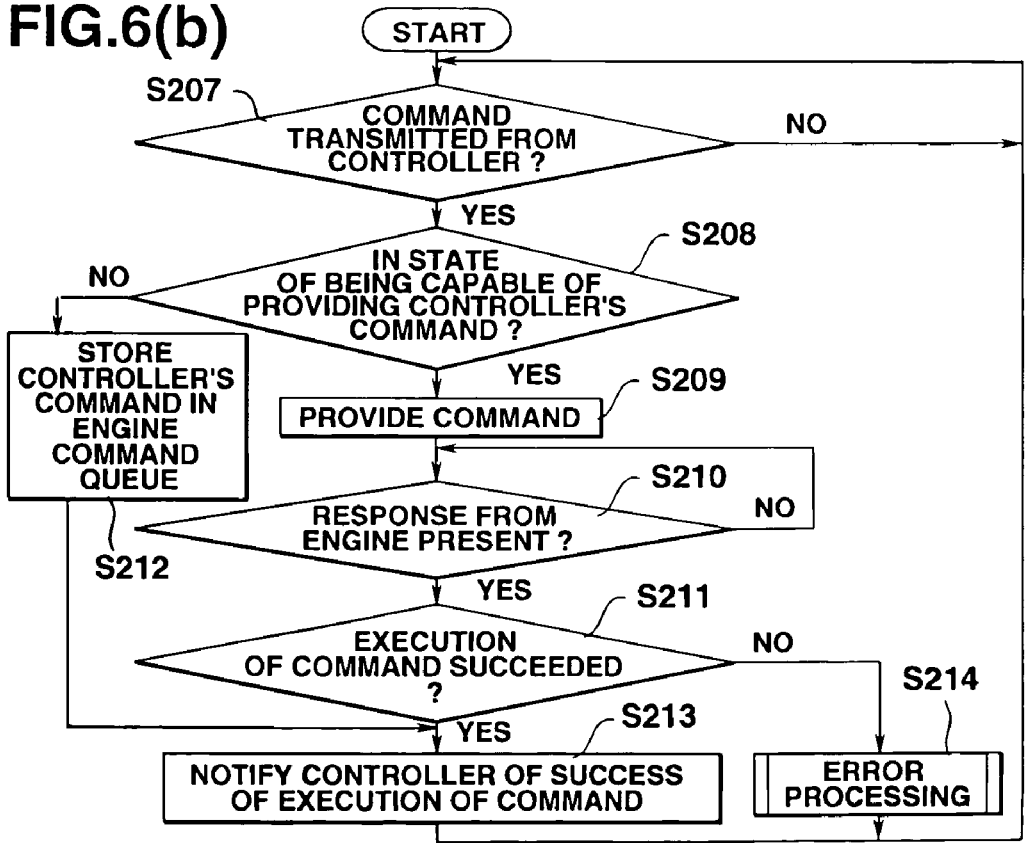

Next, a description will be provided of communication performed between the printer controller 2103 and the DC controller 2002 via the reader controller 901 with reference charts illustrating a communication operation relating to a request to change the sheet feeding cassette performed between the printer controller 2103 and the DC controller 2002. FIGS. 6(a) and 6(b) are flowcharts illustrating a communication operation of the reader controller 901 for the request to change the sheet feeding cassette from the printer controller 2103 during a copying operation.

First, a communication operation relating to a request to change the sheet feeding cassette performed between the printer controller 2103 and the DC controller 2002 will be described with reference to FIGS. 5(a) and 5(b). A description will be provided of a case in which a request to change the sheet feeding cassette is transmitted from the printer controller 2103 to the DC controller 2002 when the DC controller 2002 is in a ready state, and it is assumed that control for a copying operation by the reader controller 901 is not performed.

Figure 5A:
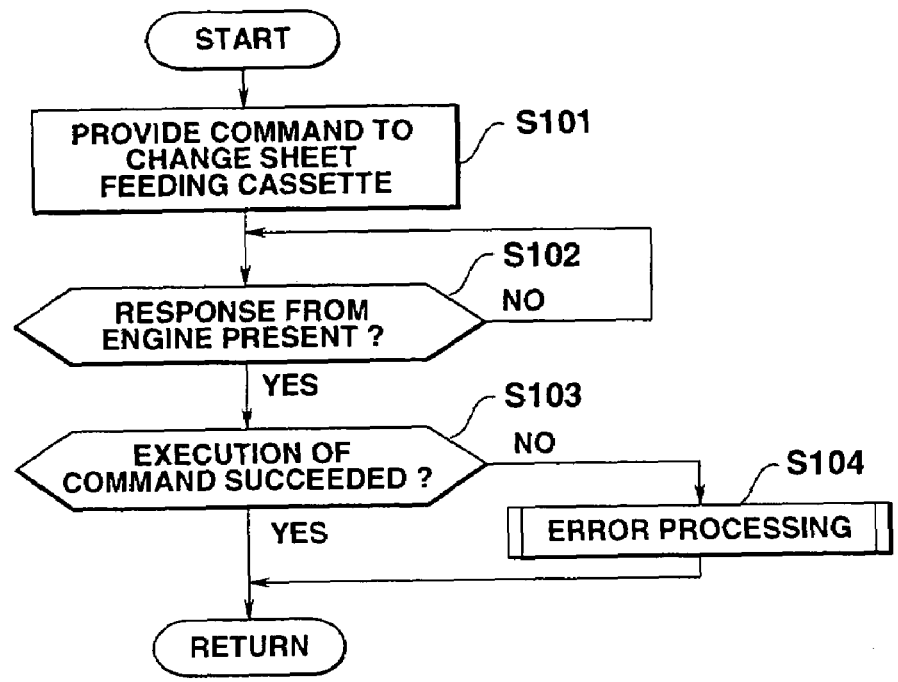
FIGS. 5(a) and 5(b) are flowcharts illustrating a communication operation relating to a request to change a sheet feeding cassette between the printer controller and the DC controller.

When providing a request to change the sheet feeding cassette from the printer controller 2103 to the DC controller 2002 when the DC controller 2002 is in a ready state, as shown in FIG. 5(a), the printer controller 2103 first provides in step S101 a command to change the sheet feeding cassette. The command to change the sheet feeding cassette is transmitted to the DC controller 2002 via the reader controller 901.

The process then proceeds to step S102, where the printer controller 2103 awaits a response returned from the DC controller 2002 via the reader controller 901. If there is a response from the DC controller 2002, the process proceeds to step S103, where it is determined if the change of the sheet feeding cassette has succeeded based on the contents of the response.

If the result of the determination in step S103 is affirmative, this processing is terminated. If the result of the determination in step S103 is negative, the process proceeds to step S104, where error processing is executed.

Figure 5B:
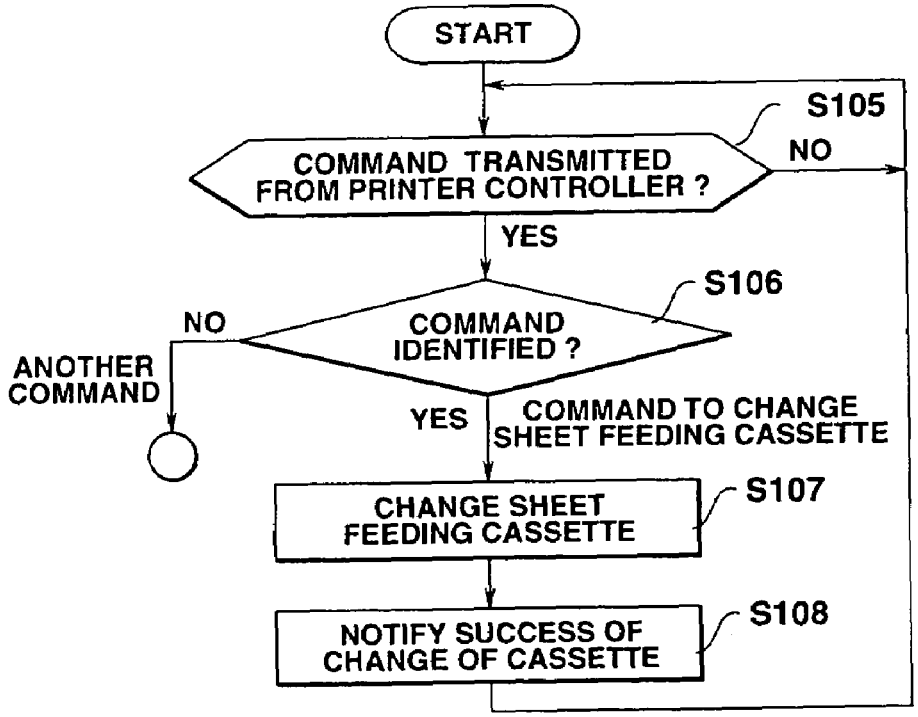

On the other hand, as shown in FIG. 5(b), the DC controller 2002 awaits in step S105 a command from the printer controller 2103. When a command from the printer controller 2103 is present, the process proceeds to step S106, where the contents of the command are identified. If the command is a command to change the sheet feeding cassette, the process proceeds to step S107, where the sheet feeding cassette is changed. Then, in step S108, the success of the change of the cassette is notified.

If the command is a command other than a command to change the sheet feeding cassette, the process proceeds to execution of processing corresponding to the command.

The communication operation of the reader controller 901 when the printer controller 2103 outputs a command, such as a request to change the sheet feeding cassette, or the like, to the DC controller 2002 as described above will now be described with reference to FIGS. 6(a) and 6(b).

As shown in FIG. 6(b), first, in step S207, the reader controller 901 determines if a command (/CCMD) has been provided from the printer controller 2103. If the result of the determination is affirmative, the command from the printer controller 2103 is received by the serial communication controller 2205, and the process proceeds to step S208.

In step S208, it is determined if a state in which the reader controller 901 can transmit the command received from the printer controller 2103 to the DC controller 2002 without being influenced is provided. If the result of the determination is affirmative, the process proceeds to step S209, where the same command (/PCMD) as that transmitted from the printer controller 2103 is transmitted to the DC controller 2002.

The process then proceeds to step S210, where a response from the DC controller 2002 is awaited. When a response from the DC controller 2002 has been received, the process proceeds to step S211, where it is determined if the execution of the command has succeeded based on the response from the DC controller 2002. If the result of the determination in step S211 is affirmative, the process proceeds to step S213, where the success of the execution of the command is notified to the printer controller 2103. For example, if the command is a command to change the sheet feeding cassette, the success of the change of the sheet feeding cassette is notified when the change of the cassette has succeeded. If the result of the determination in step S211 is negative, the process proceeds to step S214, where error processing is executed.

If the result of the determination in step S208 is negative, for example, if it is determined that the reader controller 901 is in a state of performing control relating to a copying operation by assigning a sheet feeding cassette, it is determined that the operation currently being executed may, in some cases, not be normally executed by transmitting the command received from the printer controller 2103 to the DC controller 2002, and the process proceeds to step S212. In step S212, the command received from the printer controller 2103 is not transmitted to the DC controller 2002, but is stored in an engine command queue in the sequence of provision of commands.

The process then proceeds to step S213, where the success of the execution of the command is notified to the printer controller 2103 in a pseudo manner, because the printer controller 2103 awaits a response to the provided command.

Upon completion of control relating to a copying operation and the like by the reader controller 901, then, as shown in FIG. 6(a), first, in step S201, it is determined if the reader controller 901 is in a state of being capable of transmitting the command received from the printer controller 2103 to the DC controller 2002 without being influenced. If the result of the determination is affirmative, the process proceeds to step S202, where the oldest one of commands stored in the engine command queue is first output.

The process then proceeds to step S203, where a response from the DC controller 2002 is awaited. When a response from the DC controller 2002 has been received, the process proceeds to step S204, where it is determined if the execution of the command has been succeeded based on the response from the DC controller 2002. If the result of the determination in step S204 is affirmative, the process proceeds to step S205, where the command output from the engine command queue is deleted. If the result of the determination in step S204 is negative, the process proceeds to step S206, where error processing is performed.

By thus performing control of relaying communication performed between the printer controller 2103 and the DC controller 2002 by the reader controller 901, it is possible to realize communication between the printer controller 2103 and the DC controller 2002 according to procedures substantially the same as conventional communication procedures directly performed between the printer controller 2103 and the DC controller 2002, and to operate a command processing sequence while maintaining consistency.

Figure 7:
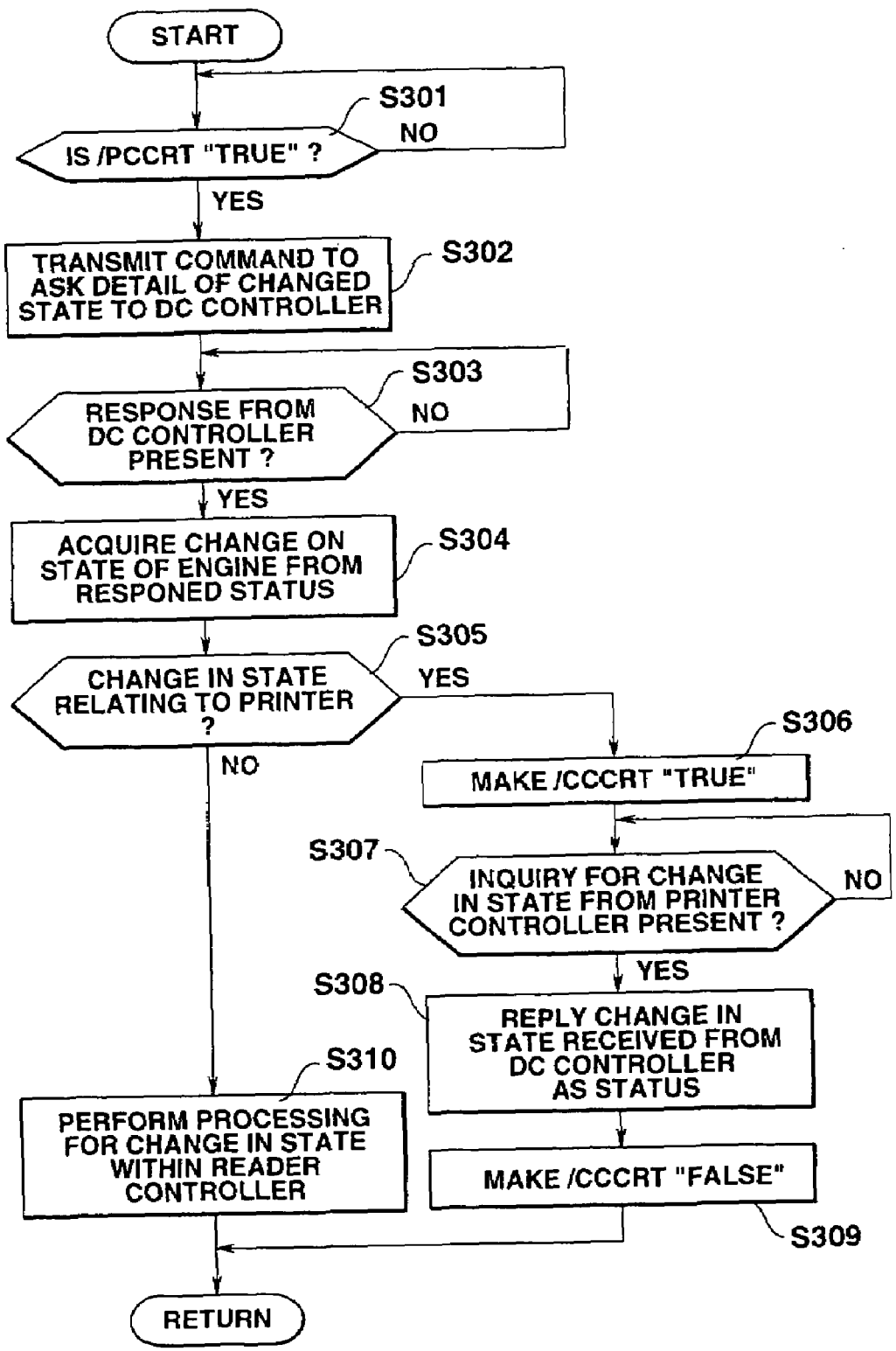
FIG. 7 is a flowchart illustrating processing when a change in the state of the engine side has been transmitted from the DC controller to the reader controller using a /PCCRT signal.

Next, a description will be provided of processing when the DC controller 2002 transmits a change in the state of the engine side to the reader controller 901 using a /PCCRT signal with reference to FIG. 7. FIG. 7 is a flowchart illustrating processing when the DC controller 2002 transmits a change in the state of the engine side to the reader controller 901 using a /PCCRT signal.

A change in the state of the engine side to be recognized by the printer controller 2103 differs, in some cases, from a change in the state of the engine side to be recognized by the reader controller 901. For example, when a jam occurs during a copying operation, a change in the state due to the jam is a change in the state which is to be recognized by the reader controller 901, but is not a change in the state which is to be recognized by the printer controller 2103. Even if this change is recognized by the printer controller 2103, the printer controller 2103 cannot execute postprocessing corresponding to this change.

Accordingly, it is necessary to transmit a change in the state occurred at the engine side during a copying operation only to the reader controller 901, and it is necessary to transmit a change in the state occurred at the engine side during a printing operation only to the printer controller 2103. However, there are some changes in the state which must be notified to both of the reader controller 901 and the printer controller 2103 irrespective of the operational mode. For example, it is necessary to notify changes in the state, such as a change in the size of the sheet feeding cassette, the absence of a sheet, and the like, to both of the reader controller 901 and the printer controller 2103. Accordingly, control is performed so that a change in the state is notified to at least one of the reader controller 901 and the printer controller 2103 depending on the contents of the change in the state.

Next, control relating to the above-described notification of a change in the state will be described in detail with reference to FIG. 7.

During a copying operation in which the reader controller 902 controls the DC controller 2002, as shown in FIG. 7, first, in step S301, the interrupt controller 2204 monitors if the /PCCRT signal becomes "TRUE" in a state in which the /PCCRT signal is masked against the printer controller 2103 by the gate function of the control circuit 2208. When a "TRUE"/PCCRT signal has been received by the interrupt controller 2204, the process proceeds to step S302, where a command to ask the detail of a change in the state is transmitted to the DC controller 2002.

The process then proceeds to step S303, where a response from the DC controller 2002 for the command is awaited. When there is a response from the DC controller 2002, the process proceeds to step S304, where a change in the state of the engine side is acquired from the responsed status.

In the next step S305, it is determined if the acquired change in the state is to be recognized by the printer controller 2103. If the result of the determination is negative, the process proceeds to step S310, where processing for the change in the state acquired by the reader controller 901 is executed, and the process is terminated.

If the result of the determination in step S305 is affirmative (for example, in the case of a change in the size of the sheet feeding cassette), the process proceeds to step S306, where a "TRUE"/CCCRT signal is transmitted to the printer controller 2103 by setting a flag by the controller circuit 2208.

In the next step S307, an inquiry for a change in the state transmitted from the printer controller 2103 in response to the "TRUE"/CCCRT signal is awaited. When such an inquiry is present, the process proceeds to step S308, where a change in the state received from the DC controller 2002 is transmitted to the printer controller 2103 as a status.

The process then proceeds to step S309, where the /CCCRT signal is made "FALSE", and the process is terminated.

Figure 8:
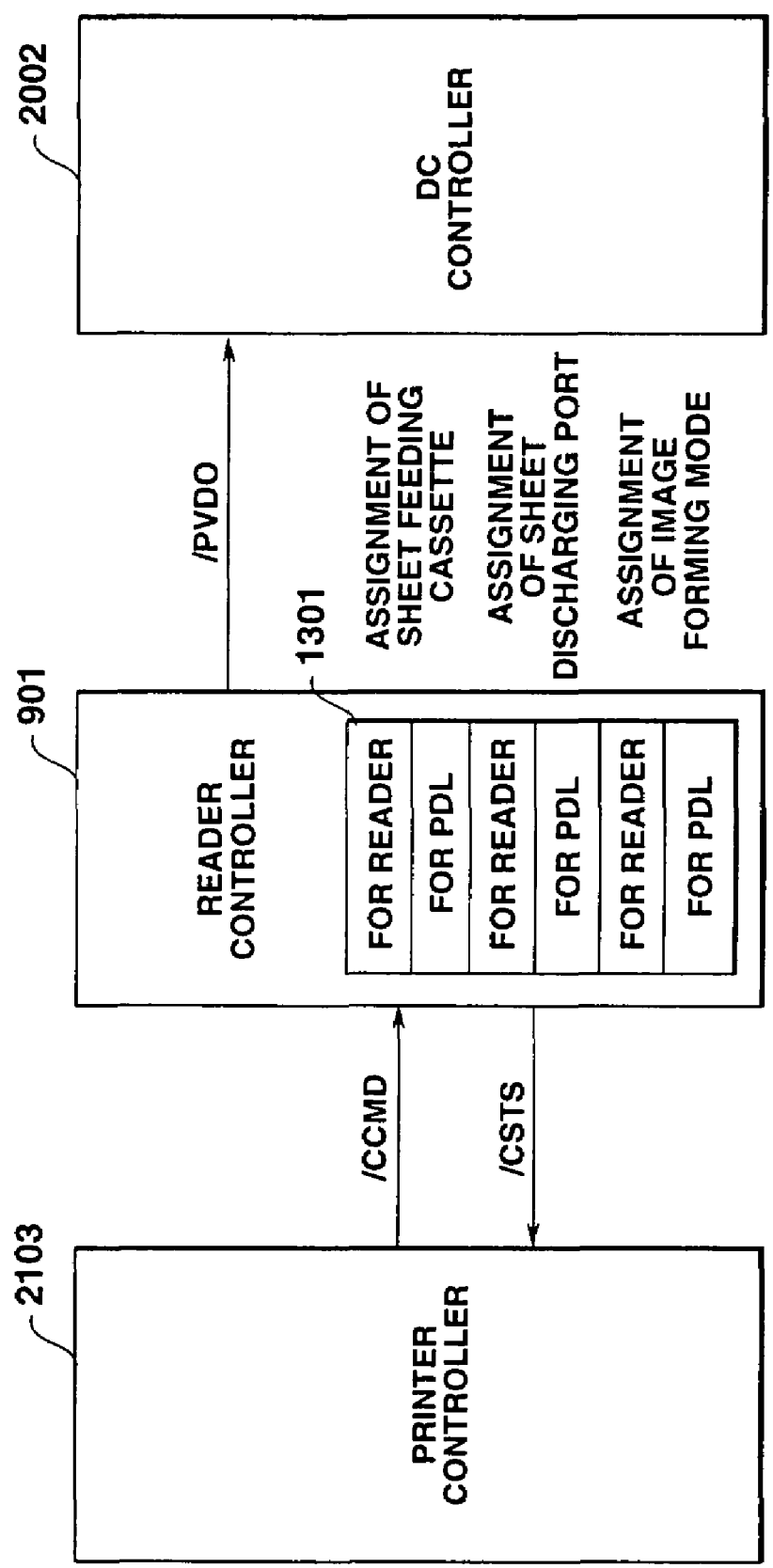
FIG. 8 is a diagram illustrating the location and exchange of data when a request for a printing operation is generated during a copying operation.
Figure 9:
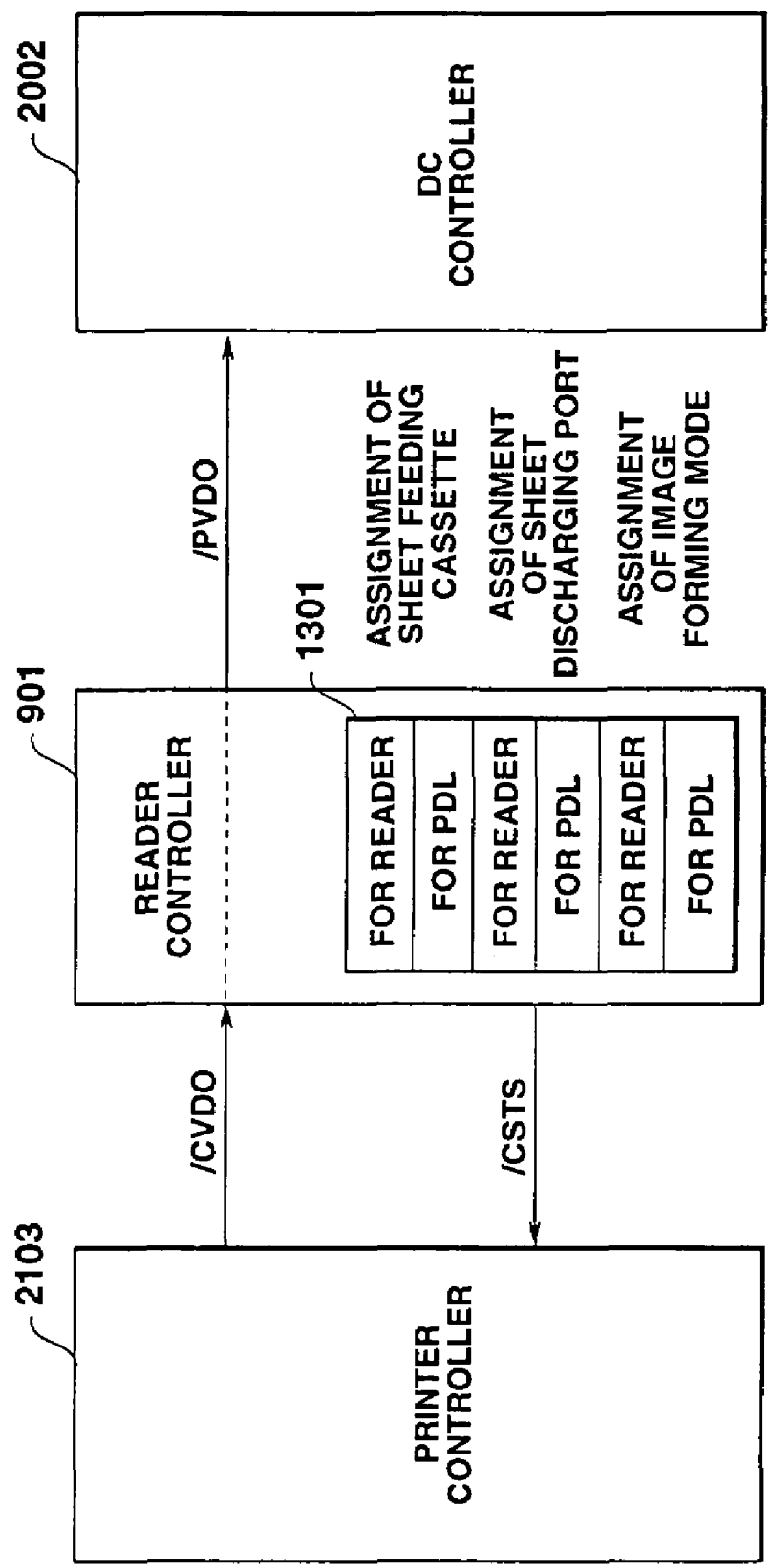
FIG. 9 is a diagram illustrating the location and exchange of data when a request for a copying operation is generated during a printing operation.
Figure 10:
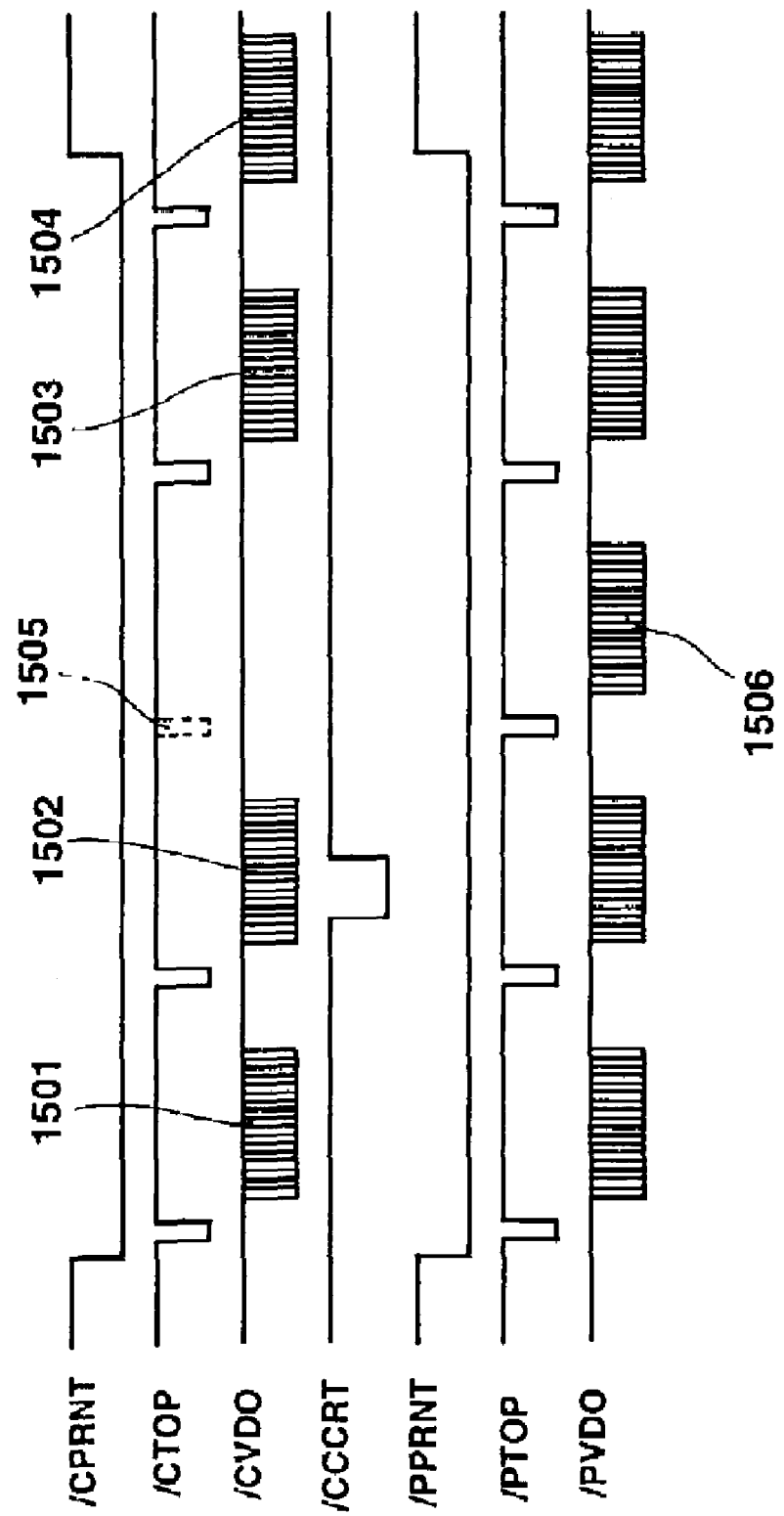
FIG. 10 is a timing chart during an interrupt copying operation.

Next, the control of an execution command will be described with reference to FIGS. 8 through 10. FIG. 8 is a diagram illustrating the location and exchange of data when a request for a printing operation is generated during a copying operation. FIG. 9 is a diagram illustrating the location and exchange of data when a request for a copying operation is generated during a printing operation. FIG. 10 is a timing chart during an interrupt copying operation. In the present embodiment, a description will be provided of a method for controlling the reader controller 901 when both of the printer controller 2103 and the reader controller 901 provide a request for the use to the DC controller 2002.

First, a description will be provided of a case in which a request for a printing operation is provided during a copying operation. During the copying operation, the DC controller 2002 receives image data PVDO transmitted from the image reading device 101 via the reader controller 901, and executes image formation. The assignment of a sheet feeding cassette, a sheet discharging port and the like, serving as setting items relating to this image forming operation, are already set by serial communication between the reader controller 901 and the DC controller 2002. As shown in FIG. 8, set values for these items are written in a buffer 1301 within the reader controller 901. Values set by the reader controller 901 for the DC controller 2002 as values for the reader, and values set by the printer controller 901 for the DC controller 2002 as values for PDL are written in the buffer 1301. These values are rewritten to newly set values at every operation.

When a request for a printing operation is provided from the printer controller 2103 during this copying operation, it is undesirable to provide a printout by interrupting a printing operation during the copying operation from the viewpoint of usability. In the present embodiment, control is performed so as to prolong execution for the request for a printing operation until the end of the copying operation currently being executed. However, it is necessary for the reader controller 901 to transmit a /CSTS signal in response to a /CCMD signal from the printer controller 2103, since the printer controller 2103 awaits a response to the request for a printing operation. Accordingly, communication between the printer controller 2103 and the reader controller 901 is performed in parallel to the copying operation. As a result, a set value for PDL is set from among set values stored in the buffer 1301 in accordance with the request from the printer controller 2103. When there is a difference between the set value for the reader and the set value for PDL stored within the buffer 1301, the reader controller 901 may perform a setting conforming to the set value for PDL for the DC controller 2002 before starting a printing operation after completing the copying operation.

More specifically, if a request for a printing operation is provided from the printer controller 2103 during a color copying operation set so that a sheet is fed from the upper cassette and is discharged onto the face-up discharging port, the execution of the printing operation is prolonged, but it is possible to perform various settings. If the request for a printing operation indicates sheet feeding from the upper cassette, sheet discharge onto the face-down discharging port, and setting of a black-and-white image formation, since both of the reader controller 901 and the printer controller 2103 assign the upper cassette, it is unnecessary to assign the upper cassette for the DC controller 2002 when switching to a printing operation is performed after the end of the copying operation. On the other hand, since settings of a discharged sheet and the image forming mode differ between the copying operation and the printing operation, it is necessary to perform settings of a discharged sheet and the image forming mode from the reader controller 901 to the DC controller 2002 after the end of the copying operation.

As described above, the reader controller 901 performs control so as to cause a command from the printer controller 2103 to prolong the execution of the command by the DC controller 2002, and to prevent an overlapped setting with respect to settings already performed by the DC controller 2002.

Next, a description will be provided of a case in which a request for a copying operation is provided during a printing operation with reference to FIG. 9. When a request for a copying operation is provided during a printing operation, it is considered desirable from the viewpoint of usability to perform an interrupt of a copying operation during the printing operation. Hence, in the present embodiment, control is performed so as to perform an interrupt of a request for a copying operation in the printing operation currently being executed.

In this printing operation, image data /CVDO from the printer controller 2103 is selected by the selector 2201, which transmits the selected data to the DC controller 2002 as a /PVDO signal. It is assumed that in this printing operation, a mode of feeding a sheet from the upper cassette, discharging the sheet onto the face-down sheet discharging port, and forming a black-and-white image is set.

The DC controller 2002 detects the end of image formation only after the /PPRNT signal from the printer controller 2103 becomes High (FALSE). Hence, the number of printouts cannot be recognized.

For example, if a printing operation is started assuming an expected number of printouts of four, and if an interrupt of a request for a copying operation is not provided from the reader controller 901 during the printing operation, /PTOP signals are generated from the DC controller 2002 four times at the above-described timing, and image data is transferred from the printer controller 2103 to the DC controller 2002 via the reader controller 901 based on the /PTOP signals.

A description will now be provided of a case in which a request for an interrupt copying operation of one copy is provided for a color original while the second printout is being formed, with reference to FIGS. 9 and 10.

Referring to FIG. 10, according to a /CPRNT signal from the printer controller 2103, the reader controller 901 transmits a /PPRNT signal to the DC controller 2002. In response to this signal, the DC controller 2002 supplies the printer controller 2103 with a /PTOP signal via the reader controller 901 as a /CTOP signal. Thus, a printing operation for first image data 1501 and a printing operation for second image data 1502 are executed. At that time, setting for the DC controller 2002 is performed in accordance with the set value for PDL stored in the buffer 1301 of the reader controller 901.

If a request for an interrupt copying operation is provided during the printing operation for the second image data, the reader controller 901 transmits a /CCCRT signal to the printer controller 2103. The /CCCRT signal is generated by the operation of the control circuit 2208 as described above.

The generation of the /CCCRT signal is performed not for showing an actual change in the state, but for requesting the printer controller 2103 to open the DC controller 2002 in order that the reader controller 901 α-quires the DC controller 2002.

In response to the /CCCRT signal, the printer controller 2103 transmits a command to ask a change in the state of the engine side to the DC controller 2002. The DC controller 2002 transmits a status indicating "during a copying operation" in response to this command.

The printer controller 2103 which has received this status detects that the DC controller 2002 is during a copying operation in a state of maintaining the /CPRNT signal to Low (TRUE), and continues to await the transmission of a /CTOP signal. This waiting for a /CTOP signal is continued forever by releasing time-out by the printer controller 2103. In a status other than "during a copying operation", the printer controller 2103 continues to await the transmission of a /CTOP signal in a state of maintaining the /CPRNT signal to Low (TRUE). This waiting for a /CTOP signal is processed as a time-out error after a predetemined time period.

The DC controller 2002 transmits a /PTOP signal, which is used for controlling a copying operation by the reader controller 901, and the transmission of a /PTOP signal, i.e., a /CTOP1505 signal, to the printer controller 2103 is masked by the gate 2207.

When the printing operation for the second image data has been completed in the above-described manner, image data /PVDO1506 obtained by reading of an original is selected from the reader controller 901 by the selector 2201 and is transmitted to the DC controller 2002, and a copying operation corresponding to the /PVDO1506 signal is executed. At that time, setting for the DC controller 2002 is performed in accordance with the set value for the reader stored in the buffer 1301 of the reader controller 901.

Upon completion of the interrupt copying operation for one sheet, the masking for the /PTOP signal is released, and the /PTOP signal is transmitted to the printer controller 2103 as a /CTOP signal. According to the transmission of the /CTOP signal, the printer controller 2103 sequentially transfers /CVDO1503 and 1504 signals to the DC controller 2002, and printouts corresponding to the /CVDO1503 and 1504 signals are obtained. The set value for PDL stored in the buffer 1301 of the reader controller 901 is reset in the DC controller 2002.

As described above, by the determination of the reader controller 901, for example, about which one of the printer controller 2103 and the reader controller 901 is to acquire the DC controller 2002, or about at what timing a command is to provide, in accordance with the state of the printer controller 2103 or the reader controller 901, a single DC controller 2002 can realize requests from two controllers, i.e., the printer controller 2103 and the reader controller 901.

Next, a description will be provided of control when the printer controller 2103 provides a command to confirm the contents of setting.

When the printer controller 2103 intends to confirm the contents of setting for the DC controller 2002, the printer controller 2103 provides a /CCMD signal as a command to confirm the contents of the setting. The reader controller 901 which has received this command retrieves setting values stored in the buffer 1301. When the contents to be confirmed are stored in the buffer 1301, the contents are read and notified to the printer controller 2103 as a /CSTS signal.

On the other hand, when the contents to be confirmed are not stored in the buffer 1301, the reader controller 901 transmits a command to confirm the contents of setting as a /PCMD signal to the DC controller 2002. The DC controller 2002 reads the contents to be confirmed based on the /PCMD signal, and notifies the reader controller 901 of the read contents as a /PSTS signal. The reader controller 901 notifies the printer controller 2103 of the notified contents as a /CSTS signal.

As described above, since the reader controller is provided between the printer controller and the engine controller (DC controller) so as to be communicatable with each of these controllers, and arbitrate the acquisition of the right to use the engine controller with the printer controller, it is possible to realize a copying function having a high processing speed without causing a large amount of change in both of hardware and software in the configuration of a printer function caused by the addition of an image reading device in order to add a copying function to the printer function.

First communication means for performing communication with the printer controller and second communication means for performing communication with the engine controller are provided in the reader controller. The reader controller receives image data and a command transmitted from the printer controller via the first communication means, and transmits the received image data and command to the engine controller via the second communication means. Hence, the reader controller can easily relay communication performed between the printer controller and the engine controller.

Since the engine controller sets predetermined different timings for operations of transmitting image data from the printer controller and the reader controller, the operations of transmitting image data from the printer controller and the reader controller to the engine controller can be performed at similar timings.

When the reader controller detects the occurrence of a change in the state of the engine controller, the reader controller determines whether or not the change in the state of the engine controller is to be notified to the printer controller in accordance with the contents of the change in the state, it is possible to notify the printer controller of the contents of the change in the state in accordance with the status of the acquisition of the right to use the engine controller by the printer controller.

When a change in the state occurs in the engine controller, the engine controller notifies the reader controller of the occurrence of the change in the state via a signal line connecting the engine controller to the reader controller. When the reader controller detects the occurrence of the change in the state of the engine controller based on the notification of the occurrence of the change in the state, the reader controller transmits a command to ask the contents of the change in the state to the engine controller via the second communication means. The engine controller transmits state-change-contents information indicating the contents of the change in the state to the reader controller in response to the asking command, so that the reader controller can determine whether or not the change in the state of the engine controller is to be notified to the printer controller in accordance with the state-change-contents information.

When the contents of the change in the state coincide with predetermined conditions, the reader controller notifies the printer controller of the change in the state. Since the predetermined conditions can be set by the printer controller, it is possible to notify the printer controller of the contents of the change in the state necessary for the printer controller.

When the printer controller recognizes the state of the acquisition of the right to use the engine controller by the reader controller via the first communication means, control different from that when the printer controller acquires the right to use the engine controller is performed. Hence, control adapted to a newly generated state as a result of addition of the reader controller can be executed.

Since the reader controller is provided between the printer controller and the engine controller so as to be communicatable with each of these controllers, and analyzes a command provided from the printer controller to the engine controller and performs control for the execution of the command by the engine controller in accordance with the result of the analysis, it is possible to realize a copying function having a high processing speed without causing a large amount of change in the hardware and software in the configuration of a printer function caused by the addition of an image reading device in order to add a copying function to the printer function, and to transmit the command provided from the printer controller to the engine controller while maintaining consistency in the operation.

When the printer controller controls the engine controller, the printer controller performs control so as to delay the execution of a command causing a change in the load of the engine controller and to instantaneously execute a command capable of obtaining the status of the engine controller, from among commands provided from the reader controller to the engine controller. Hence, it is possible to operate a command processing sequence while maintaining consistency.

When the reader controller controls the engine controller, the reader controller performs control so as to first make a command causing a change in the load of the engine controller to wait within the reader controller and to delay the execution of the command by transmitting a response corresponding to the command to the printer controller, and to instantaneously execute a command capable of obtaining the status of the engine controller, from among commands provided from the printer controller to the engine controller. Hence, it is possible to operate a command processing sequence while maintaining consistency.

The reader controller is provided between the printer controller and the engine controller so as to be communicatable with each of these controllers. When a set-state confirming command for confirming the set state of the engine controller is provided from the printer controller, the reader controller retrieves the location of the status corresponding to the set-state confirming command, reads the corresponding status from the location, and transmits the read status to the printer controller. Hence, it is possible to realize a copying function having a high processing speed without causing a large amount of change in the hardware and software in the configuration of a printer function caused by the addition of an image reading device for adding a copying function to the printer function, and to prevent a decrease in the communication efficiency due to the provision of the reader controller between the printer controller and the engine controller.

When the location of the status corresponding to the set-state confirming command is within the reader controller, the reader controller transmits the status corresponding to the set-state confirming command to the printer controller via the first communication means. When the location of the status corresponding to the set-state confirming command is within the engine controller, the reader controller transmits a command equivalent to the set-state confirming command to the engine controller via the second communication means. In response to that command, the engine controller transmits a status equivalent to the status transmitted via the second transmission means to the printer controller via the first communication means. Hence, communication relating to the confirmation of the set state can be efficiently executed.

Since the reader controller is provided between the printer controller and the engine controller so as to be communicatable with each of these controllers, and the reader controller rewrites the status for each of the printer controller and the reader controller every time the setting of the operation of the engine controller is performed and stores the obtained status, it is possible to realize a copying function having a high processing speed without causing a large amount of change in the hardware and software in the configuration of a printer function caused by the addition of an image reading device for adding a copying function to the printer function, and to reduce the amount of communication processing relating to the setting of operations.

The individual components shown in outline or designated by blocks in the drawings are all well-known in the electronic mail apparatus arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus connectable to an external device that can transmit printing data and to an original-reading device which generates reproduction image data by reading an original image, said image processing apparatus employing an image forming device which forms an image on a sheet, said image processing apparatus comprising:
   an engine controller for controlling the image forming device based on image data;
   a printer controller for forming print image data from the printing data transferred from the external apparatus, for transmitting the print image data to said engine controller, and for transmitting a command for setting an operation of said engine controller to said engine controller;
   a reader controller for receiving the reproduction image data generated by the original-reading device, and for transmitting the reproduction image data to said engine controller; and
   holding means for holding the command if the command is transmitted from said printer controller while said reader controller is transmitting the reproduction image data to said engine controller, and for transmitting the held command to said engine controller after said reader controller completes transmitting the reproduction image data to said engine controller.

2. The apparatus according to claim 1, wherein said holding means holds the command while said reader controller is transmitting the reproduction image data if the command causes a change in a load of the image forming device.

3. A controller for an image forming apparatus connectable to an external apparatus and to an original-reading device which outputs reproduction image data formed by reading an original image, the image forming apparatus employing an image forming device for forming an image on a sheet, a printer controller which outputs (i) print image data formed from printing data transferred from the external apparatus and (ii) a command for setting an operation of the image forming device, and an engine controller which controls the image forming device based on the reproduction image data output by the original-reading device and the command and the print image data output by the printer controller, said controller comprising:
   first reception means for receiving the reproduction image data output by the original-reading device;
   second reception means for receiving the command and the print image data output by the printer controller;
   selection means for selecting one of the reproduction image data received by said first reception means and the print image data received by said second reception means, and for transmitting the selected image data to the engine controller which controls the image forming device based on the selected image data; and
   holding means for holding the command if the command is received by said second reception means while the reproduction image data received by said first reception means is being transmitted to the engine controller, and for transmitting the held command to the engine controller after completion of the transmitting of the reproduction image data to the engine controller.

4. The apparatus according to claim 2, wherein said holding means holds the command while the reproduction image data is being transmitted if the command causes a change in a load of the image forming device.

5. A method of controlling an image forming apparatus, by controlling a reader controller which controls an original-reading device which outputs reproduction image data by reading an image of an original, the image forming apparatus being connected to an external apparatus and employing an image forming device for forming an image on a sheet, a printer controller which outputs (i) print image data formed from printing data transferred from the external apparatus and (ii) a command for setting an operation of the image forming device, and an engine controller which controls the image forming device based on the reproduction image data output by the original-reading device and the command and the print image data output by the printer controller, said method comprising the steps of:
   a first reception step of receiving the reproduction image data output by the original-reading device;
   a second reception step of receiving the command and the print image data output by the printer controller;
   a selecting step of selecting one of the reproduction image data received from the original-reading device and the print image data received from the printer controller and transmitting the selected image data to the engine controller which controls the image forming device based on the selected image data;
   a holding step of holding the command if the command is received from the printer controller while the reproduction image data received from the original-reading device is being transmitted to the engine controller; and
   a transmitting step of transmitting the held command to the engine controller after completion of the transmitting of the reproduction image data to the engine controller.

6. The method according to claim 5, wherein the command is held in said holding step if the command causes a change in a load of the image forming device.

7. An image processing apparatus usable with an external device that can transmit printing data, said image processing apparatus comprising:
an original-reading device which reads an original image and outputs reproduction image data based on the read original image;
a printer;
an engine controller connected to said printer, controlling said printer based on received image data, and outputting a first state signal indicating a condition of said printer;
a reader controller connected to said original-reading device and said engine controller, said reader controller receiving the reproduction image data output by said original-reading device, transmitting the reproduction image data to said engine controller, and receiving the first state signal output by said engine controller; and
a printer controller connected to said reader controller and connectable to the external device, said printer controller receiving the printing data transmitted from the external apparatus, forming print image data from the printing data, and transmitting the print image data to said engine controller via said reader controller,
said reader controller further comprising:
a first input port connected to the original-reading device, for receiving the reproduction image data;
a second input port connected to the printer controller, for receiving the print image data;
a third input port connected to the engine controller for receiving the first state signal;
a selector connected to the engine controller, for selecting one of the reproduction image data received via said first input port and the print image data received via said second input port, and for relaying the selected image data to the engine controller;
a transmitting unit connected to the printer controller, for selectively transmitting to the printer controller a second state signal indicating the condition of the printer, and
a processor connected to the transmitting unit and to the selector, for controlling the selective transmission of the second state signal by said transmitting unit, in accordance with a content of the state signal output by the engine controller, and for controlling the selection of the selected image data by said selector.

8. The apparatus according to claim 7, wherein said processor controls the selective transmission of the second state signal by said transmitting unit in accordance with which of the reproduction image data and the print image data has been selected by said selector for relaying to said engine controller.

9. The apparatus according to claim 7, wherein the condition indicated by the first and second state signals is a change in a state of the printer.

10. A controller for an image forming apparatus connectable to an external apparatus, the image forming apparatus employing a printer, an original-reading device which reads an original image and outputs reproduction image data based on the original image, a printer controller which receives printing data transferred from the external apparatus and outputs print image data based on the printing data, and an engine controller which controls the printer based on the reproduction image data and the print image data and which outputs a first state signal indicating a condition of the printer, said controller comprising:
a first input port connected to the original-reading device, for receiving the reproduction image data;
a second input port connected to the printer controller, for receiving the print image data;
a third input port connected to the engine controller for receiving the first state signal;
a selector connected to the engine controller, for selecting one of the reproduction image data received via said first input port and the print image data received via said second input port, and for relaying the selected image data to the engine controller;
transmitting means connected to the printer controller, for selectively transmitting to the printer controller a second state signal indicating the condition of the printer; and
a processor connected to the transmitting means and the selector, for controlling the selective transmission of the second state signal by said transmitting means, in accordance with a content of the state signal output by the engine controller, and for controlling the selection of the selected image data by said selector.

11. The controller according to claim 10, wherein said processor controls the selective transmission by said transmitting means also in accordance with a source of the selected image data.

12. The controller according to claim 10, wherein the condition indicated by the state signals is a change in a state of the printer.

13. A control method for an image forming apparatus connected to an external apparatus, the image forming apparatus employing a printer, an original-reading device which reads an original image and outputs reproduction image data based on the original image, a printer controller which receives printing data transferred from the external apparatus and outputs print image data based on the printing data, and an engine controller which controls the printer based on the reproduction image data and the print image data and which outputs a first state signal indicating a condition of the printer, said method comprising the steps of:
receiving the reproduction image data from the original-reading device;
receiving the print image data from the printer controller;
receiving the first state signal from the engine controller;
selecting one of the received reproduction image data and the received print image data;
relaying the selected image data to the engine controller; and
selectively transmitting a second state signal, indicating the condition of the image forming device, to the printer controller in accordance with a content of the received first state signal.

14. The method according to claim 13, wherein in said selectively transmitting step the second state signal is selectively transmitted to the printer controller also in accordance with a source of the selected image data.

15. The method according to claim 13, wherein the condition indicated by the state signals is a change in a state of the printer.

16. An image processing apparatus connectable to an external device that can transmit printing data, said image processing apparatus comprising:
a printer;
an original-reading device which outputs reproduction image data by reading an image of an original;
a printer controller for receiving the printing data transmitted by the external apparatus, forming print image data based on the printing data, outputting the print image data, and outputting a command for setting a printer operation;

an engine controller for controlling said printer based on the command, the reproduction image data and the print image data; and a reader controller connected to said engine controller, said original-reading device and said printer controller, said reader controller receiving and relaying the reproduction image data, the print image data and the command to said engine controller, said reader controller including a buffer in which the command is held if the command is output by said printer controller while said reader controller is relaying the reproduction image data to said engine controller, said reader controller transmitting the held command to said engine controller after said reader controller completes relaying the reproduction image data to said engine controller.

17. The apparatus according to claim 16, wherein the command is held in said buffer while said reader controller is relaying the reproduction image data only if the command causes a change in a load of said printer.

18. A controller for an image forming apparatus connectable to an external apparatus, the image forming apparatus employing a printer, an original-reading device which reads an original image and outputs reproduction image data based on the original image, a printer controller which receives printing data from the external apparatus and outputs (i) print image data based on the printing data and (ii) a command for setting a printer operation, and an engine controller which controls the printer based on the command, the reproduction image data and the print image data, said controller comprising:

a first input port connected to the original-reading device, for receiving the reproduction image data from the original-reading device;

a second input port connected to the printer controller, for receiving the print image data and the command from the printer controller;

a selector for selecting one of the reproduction image data received via said first input port and the print image data received via said second input port and relaying the selected image data to the engine controller;

a buffer in which the command is selectively stored; and a processor which selectively stores the command in the buffer if the command is received via said second input port while said selector is relaying the reproduction image data to the engine controller, and which transmits the stored command to the engine controller after said selector completes relaying the reproduction image data to the engine controller.

19. The apparatus according to claim 18, wherein said processor stores the command in the buffer while said selector is relaying the reproduction image data only if the command causes a change in a load of the printer.

20. A method of controlling an image forming apparatus connected to an external apparatus, the image forming apparatus employing a printer, an original-reading device which reads an original image and outputs reproduction image data based on the original image, a printer controller which receives printing data from the external apparatus and outputs (i) print image data based on the printing data and (ii) a command for setting a printer operation, and an engine controller which controls the printer based on the command, the reproduction image data and the print image data, said method comprising the steps of:

receiving the reproduction image data from the original-reading device;

receiving the print image data from the printer controller;

receiving the command from the printer controller;

selecting one of the received reproduction image data and the received print image data;

relaying the selected image data to the engine controller;

holding the received command if the command is received while the received reproduction image data is being relayed to the engine controller; and transmitting the held command to the engine controller after the received reproduction image data has been relayed to the engine controller.

21. The method according to claim 20, wherein the command is held in said holding step only if the command causes a change in a load of the printer.

22. An image processing apparatus connectable to an external device that can transmit printing data, said image processing apparatus comprising:

a printer;

an engine controller connected to the printer, controlling the printer based on image data, and outputting a data transmission synchronization signal;

a printer controller connectable to the external device, for receiving the printing data, forming print image data from the printing data and outputting the print image data in response to the data transmission synchronization signal from said engine controller;

an original-reading device which outputs reproduction image data by reading an image of an original in response to the data transmission synchronization signal from said engine controller; and a reader controller connected to said engine controller, said original reading device and said printer controller, said reader controller further comprising:

a first input port connected to the original-reading device for receiving the reproduction image data from the original-reading device;

a second input port connected to the printer controller for receiving the print image data from the printer controller;

a third input port connected to the engine controller for receiving the data transmission synchronization signal from the engine controller;

a selector connected to the engine controller, for selecting one of the reproduction image data received via said first input port and the print image data received via said second input port, and for relaying the selected image data to the engine controller;

a gate for selectively transmitting the data transmission synchronization signal received from the engine controller to said printer controller; and a processor for controlling said original-reading device in accordance with the data transmissions synchronization signal, and for controlling said gate to transmit the data transmissions synchronization signal to said printer controller when said selector selects to relay the print image data to the engine controller.

23. The apparatus according to claim 22, wherein when there is a request to transmit the reproduction image data from said original-reading device to said engine controller while the print image data from said printer controller is being transmitted to said engine controller, said reader controller interrupts transmission of the data transmission synchronization signal to said printer controller and utilizes the data transmission synchronization signal to control said original-reading device.

24. A reader controller for controlling an image forming apparatus connectable to an external apparatus that can transmit printing data, the image forming apparatus employing a printer, an engine controller which controls the printer based on image data and outputs a data transmission synchronization signal, and a printer controller which forms print image data from the printing data transferred from the external signal, the image forming apparatus being connectable to an original-reading device which outputs reproduction image data by reading an image of an original in response to the data transmission synchronization signal, said reader controller comprising:

a first input port connected to the original-reading device for receiving the reproduction image data from the original-reading device;

a second input port connected to the printer controller for receiving the print image data from the printer controller;

a third input port connected to the engine controller for receiving the data transmission synchronization signal from the engine controller;

a selector connected to the engine controller, for selecting one of the reproduction image data received via said first input port and the print image data received via said second input port and relaying the selected image data to the engine controller;

a gate for selectively transmitting the data transmission synchronization signal received from the engine controller to said printer controller; and a processor for controlling said original-reading device in accordance with the data transmission synchronization signal and for controlling said gate to transmit the data transmission synchronization signal to said printer controller when the print image data is to be transmitted to the engine controller.

25. The apparatus according to claim 24, wherein when there is a request to transmit the reproduction image data from the original-reading device to the engine controller while the print image data from the printer controller is being transmitted to the engine controller, said processor controls the gate to interrupt the transmission of the data transmission synchronization signal to the printer controller and utilizes the data transmission synchronization signal to control the original-reading device.

26. A control method for an image forming apparatus connectable to an external apparatus that can transmit printing data, the image forming apparatus employing a printer for forming an image on a sheet, an engine controller which controls the printer based on image data and outputs a data transmission synchronization signal, and a printer controller which forms print image data from the printing data transferred from the external apparatus the image forming apparatus being connectable to an original-reading device which outputs reproduction image data by reading an image of an original in response to the data transmission synchronization signal, comprising:

receiving the reproduction image data from the original-reading device;

receiving the print image data from the printer controller;

receiving the data transmission synchronization signal from the engine controller;

selecting one of the reproduction image data received from the original-reading device and the print image data received from the printer controller;

relaying the selected image data to the engine controller;

selectively controlling the original-reading device based on the received data transmission synchronization signal when the reproduction image data is selected; and selectively transmitting the received data transmission synchronization signal to the printer controller when the print image data is selected.

27. The method according to claim 26, wherein when there is a request to transmit the reproduction image data from the original-reading device to the engine controller while the print image data from the printer controller is being transmitted to the engine controller, said selectively transmitting step is interrupted and said selectively controlling step is performed.

* * * * *

UNITED STATES PATENT AND TRADEMARK OFFICE
CERTIFICATE OF CORRECTION

PATENT NO. : 6,992,784 B1  
APPLICATION NO. : 09/447718  
DATED : January 31, 2006  
INVENTOR(S) : Hideto Kohtani et al.

It is certified that error appears in the above-identified patent and that said Letters Patent is hereby corrected as shown below:

COLUMN 6
    Line 33, "=conductor" should read --conductor--.

COLUMN 11
    Line 63, "-device" should read --device--.

COLUMN 22
    Line 4, "α-quire" should read --acquire--.

COLUMN 30
    Line 23, "data" should read --data,--.

Signed and Sealed this

Nineteenth Day of December, 2006

JON W. DUDAS  
*Director of the United States Patent and Trademark Office*